United States Patent
Ogino et al.

(10) Patent No.: US 7,082,574 B2
(45) Date of Patent: Jul. 25, 2006

(54) PRINTING OUTPUT USER INTERFACE CONTROL METHOD, RECORDING MEDIUM STORING THE METHOD IN PROGRAM, AND PRINTING DATA SUPPLY DEVICE AND INFORMATION PROCESSING SYSTEM EXECUTING THE PROGRAM

(75) Inventors: Kumiko Ogino, Tenri (JP); Yasuhiro Nakai, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 369 days.

(21) Appl. No.: 09/881,681

(22) Filed: Jun. 18, 2001

(65) Prior Publication Data

US 2002/0054109 A1    May 9, 2002

(30) Foreign Application Priority Data

Jun. 28, 2000  (JP) ............................. 2000-194758

(51) Int. Cl.
G06F 3/00 (2006.01)
(52) U.S. Cl. .................. 715/764; 715/808; 715/809
(58) Field of Classification Search ............... 345/764, 345/710, 747, 744; 715/808, 809
See application file for complete search history.

(56) References Cited

U.S. PATENT DOCUMENTS

| 5,442,732 A | * | 8/1995 | Matysek et al. ........... 358/1.17 |
| 5,504,687 A | * | 4/1996 | Wolf ........................ 700/95 |
| 5,669,040 A |   | 9/1997 | Hisatake |
| 5,758,110 A | * | 5/1998 | Boss et al. ................. 345/751 |
| 5,832,298 A | * | 11/1998 | Sanchez et al. ............. 710/8 |
| 6,182,039 B1 | * | 1/2001 | Rigazio et al. ............. 704/257 |

FOREIGN PATENT DOCUMENTS

| JP | 8-194588 A | 7/1996 |
| JP | 8-272557 A | 10/1996 |

* cited by examiner

*Primary Examiner*—Sy D. Luu
*Assistant Examiner*—Lê Nguyen
(74) *Attorney, Agent, or Firm*—Nixon & Vanderhye P.C.

(57) ABSTRACT

In a computer in which control software is installed, a display capability information receiving section conducts an information receiving process, receiving display capability information of a display device from a display capability information receiving/sending section of a printer beforehand. In printing job information settings, a display capability match/comparison section conducts a comparison process, comparing a user name and a printing job name inputted manually by a user or automatically by a job name and other data receiving section, with the display capability information received in the information receiving process, and determining whether the indication of the names is suitable for the display capability or not. A comparison result processing section receives the above comparison result, and when the indication is not suitable for the display capability, it conducts a notifying process, notifying the user to input the names using characters suitable for the display capability. Thus, user input setting support is provided so as to set printing job information at a printing data supply device using characters suitable for the display capability of the display device of a printing output device.

12 Claims, 18 Drawing Sheets

FIG. 4
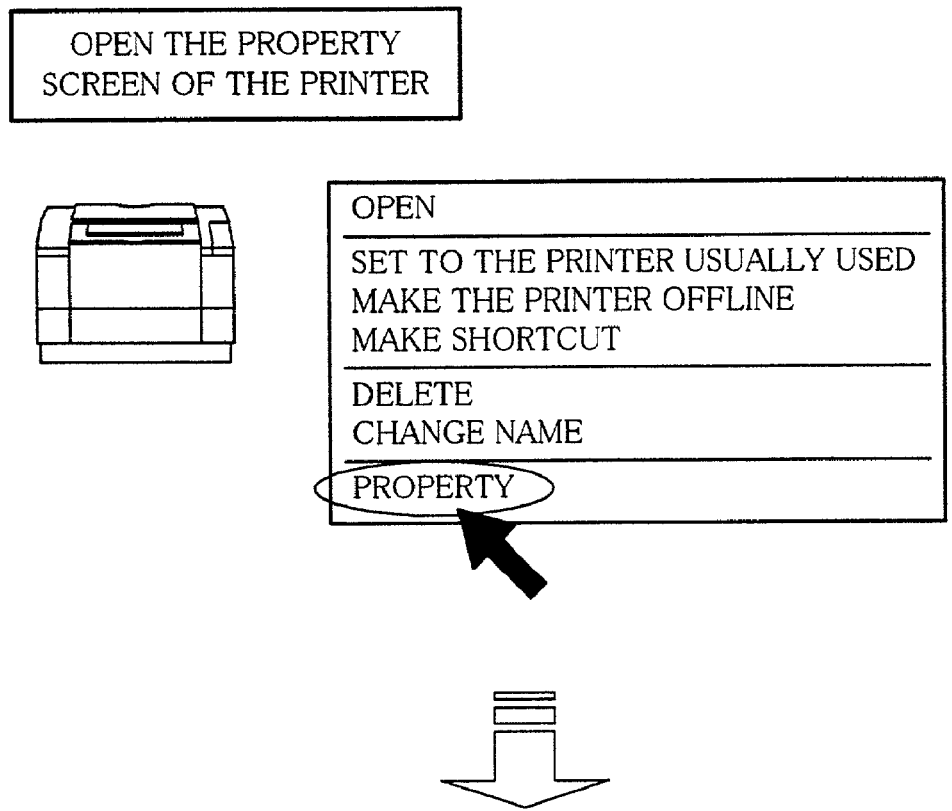
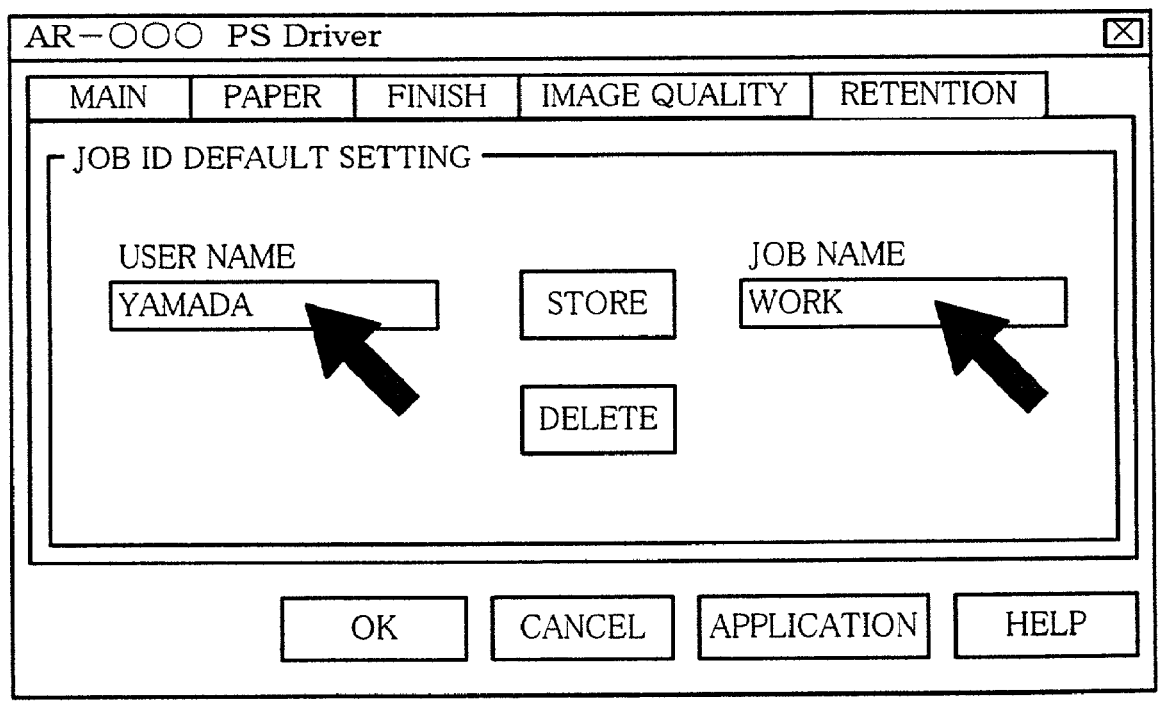

PRINTING OUTPUT USER INTERFACE CONTROL METHOD, RECORDING MEDIUM STORING THE METHOD IN PROGRAM, AND PRINTING DATA SUPPLY DEVICE AND INFORMATION PROCESSING SYSTEM EXECUTING THE PROGRAM

FIELD OF THE INVENTION

The present invention relates to a printing output user interface control method which provides user input setting support in a printing-related information setting environment at a printing data supply device when a display device installed in a printing output device such as a copying machine, a printer, etc., performs a predetermined display according to information supplied externally, a recording medium which stores the method in a program, and a printing data supply device and an information processing system which execute the program.

BACKGROUND OF THE INVENTION

In recent years, group use of a printing output device such as a copying machine and a printer as a network printer has been becoming pervasive, and various suggestions have been made so that each client can use such a device conveniently. For example, in a printer system disclosed in Japanese Unexamined Patent Publication No.8-272557/1996 (Tokukaihei 8-272557, published on Oct. 18, 1996), printing job information such as printing job waiting condition sent to a printing output device can be easily checked at a printing data supply device such as a personal computer. However, if a processing error is occurred at the printing output device or a user desires to print out confidential print, the user has to perform operations at the printing output device. Therefore, if the configuration mentioned in the above publication is applied in such a situation, the user has to go back to the printing data supply device to check the printing job information after performing the above operations at the printing output device, which would be very inconvenient for the user.

In such a case that operations at a printing output device are required as mentioned above, a printer system disclosed in Japanese Unexamined Patent Publication No.8-307583/1996 (Tokukaihei 8-307583, published on Nov. 22, 1996) is effective to solve the problem. This printer system indicates a list of waiting printing jobs including the printing jobs pending at a printing output device, and enables a user to check the content on the list. In addition, the user can make next directions such as altering the once directed job content or directing printing, based on the content checked on the job list.

Therefore, it has become essential recently that information about a directed printing job can be checked not only at a printing data supply device by which the printing job is directed, but also at a printing data output device.

A configuration which enables a user to check printing job information at a printing output device will be explained as follows, taking confidential print function, a printing function, as an example. FIG. 13 is a view showing a configuration of an information processing system 1 in which a computer 2 as a printing data supply device and printers 3 as printing data output devices are connected via network. In some cases, the configuration includes a plurality of computers 2. Confidential print function is a printing function designed to enhance security for private printing. Under the function, the printer 3 does not print out the job content immediately after a user directs a printing job via the computer 2; the user has to input a password at the printer 3 to direct output before acquiring the desired printing output. To use Confidential print function, the user name, the job name, and the user's password should be inputted via a printer driver setting screen of the computer 2.

When the printer 3 can handle PDL (Page Discript Language) such as PS (PostScript: the trademark of Adobe Systems Inc.) and HP-PCL or PCL (Hewlett-Packard Printer Control Language: the trademark of Hewlett-Packard) as shown in FIG. 14, a PS driver screen or a PCL driver screen is invoked to direct a printing job from the computer 2. For example, to send "Meeting Document.xls" among the confidential print jobs shown in FIG. 14 to the printer 3, double-click the icon of the file "Meeting Document" prepared using a certain application software package to open the file, as shown in FIG. 15. Next, choose Print from the File menu to open the Print screen. Then, choose the printer 3 to be used for printing and choose Property.

Then, a PS driver setting screen shown in FIG. 16($a$) appears, and if the radio button for Confidential Print in the Retention Print tag is checked, the gray-out of the job ID input section disappears and the user name, the printing job name, and the password can be inputted. In addition to manual input by the user, the user name and the printing job name can be automatically inputted from the log-in name of the computer 2 and from the file name on the application software, respectively, for easier user setting. Suppose "YAMADA" and "Meeting Document" are inputted as the user name and the printing job name, respectively, then the screen goes back to the Print screen shown in FIG. 17 and the printing job can be directed. Similar procedures are taken when using PCL.

Thus, the PS data or the PCL data is sent to the printer 3, together with printing style information such as confidential print function setting and printing sheet information, and page information including the user name and the printing job name. As shown in FIG. 14, these data are stored as pending data in a specified area in a hard disk 3$a$, and the user name and the printing job name in the page information are displayed by a display control section 3$b$ on the screen of a display device (printing job information display section) 3$c$, which is a LCD display device or the like installed in the printer 3, as printing job information showing that the file is waiting to be directed for printing. As other confidential print jobs are sent following the same procedure, user names and printing job names are listed on the screen of the display device 3$c$ as shown in FIG. 14.

To print out the confidential print job, the user directs output via the above list indication using the password set on the printer driver setting screen. Then, the PS data or the PCL data for the confidential print job is read out from the hard disk 3$a$ to a PDL data storage area in a memory 3$d$, function processing such as rasterization is conducted, and the data is developed to a bit image in a RIS (Raster Image Processor) data storage area in the memory 3$d$. At this point, the page information is separated from the PS data or the PCL data and read out in a specified area in the memory 3$d$. The developed RIP data is converted to an image on a photoconductor drum 3$f$ by a LSU/engine control section 3$e$ according to the page information and thus printed out.

Generally, a display device including a LCD display device or the like which is installed in a printing output device such as the printer 3 to show a printing job list is inferior to a display device in a printing data supply device such as the computer 2 in terms of display capability, due to the limitation on the number of characters displayable or on the fonts or languages which can be indicated according to the performance of a display driver. On the other hand, electronic data to be outputted take various forms including documents prepared using various types of application software, Web pages, and e-mails. In addition, with the increasing use of Internet, not only Japanese but also English and other languages are used to show the file names of the above electronic data. Despite of the need for a printing output device equipped with a display device capable of being used in such an environment, such requirements have not been satisfied yet in realities.

Therefore, the display capability of the printer 3 connected to the network varies as shown in FIG. 13, according to the type of the printer connected, and some printers can indicate Japanese katakana, alphanumerics, and other special characters, while some can also handle Japanese kanji. For this reason, there may be problems where printing job information such as a user name or a printing job name which can be inputted and checked at a printing data supply device cannot be displayed correctly at a display device of a printing output device. For example, in the case that the display device of a printing output device cannot display Japanese but the printing job information set by a printing data supply device is Japanese, the indication on the display device of the printing output device does not show correct Japanese characters, as shown in FIG. 18. In the case of FIG. 18, since several users direct confidential print function continuously, printing jobs "Kaigi Shiryou" (Meeting Document), "Shiyou" (Specifications), "Fukui" (a user name), "Nitteihyou" (Itinerary), and "Jushoroku" (Address), named in Japanese kanji in FIG. 14, are continuously indicated on the printing job list with characters transformed. In such a situation, it is difficult for a user to recognize which job is the one the user desires and to choose the job from the list on the display device of the printing output device.

SUMMARY OF THE INVENTION

It is an object of the present invention to provide a printing output user interface control method which provides user input setting support so that a user can set printing job information at a printing data supply device with characters suitable for the display capability of a display device of a printing output device, a recording medium which stores such a method as a program, a printing data supply device and an information processing system which execute such a program.

In order to attain the above object, the printing output user interface control method of the present invention is a printing output user interface control method to control printing job information settings for a user interface which provides a printing-related information setting environment on a user interface display section formed in a printing data supply device, when printing data is supplied with the printing job information from the printing data supply device connected with a printing output device via network to the printing output device equipped with a printing job information display section which indicates printing job information by each printing job, and the method includes the steps of:

a) receiving display capability information of the printing job information display section by the printing data supply device from the printing output device;

b) comparing printing job information manually or automatically inputted in the setting environment with the display capability information received by the printing data supply device in the step a); and c) providing a user with an indication to input the printing job information with characters suitable for the display capability of the printing job information display section when the printing job information is inputted with characters not suitable for the display capability of the printing job information display section.

According to the above invention, the display capability information of the printing job information display section of the printing output device is received in the printing data supply device beforehand, and compared with printing job information manually or automatically inputted. When characters used to input the printing job information are not suitable for the display capability of the printing job information display section, the user is prompted to input the information with characters suitable for the display capability, such as not Japanese but alphanumerics.

Thus, the user can set printing job information at the printing data supply device, using characters suitable for the display capability of the display device (printing job information display section) of the printing output device.

In addition, in order to attain the above object, the printing output user interface control method of the present invention is a printing output user interface control method to control printing job information settings for a user interface which provides a printing-related information setting environment on a user interface display section formed in a printing data supply device, when printing data is supplied with the printing job information from the printing data supply device connected with a printing output device via network to the printing output device equipped with a printing job information display section displaying printing job information by each printing job, and the method includes the steps of:

a) receiving display capability information of the printing job information display section by the printing data supply device from the printing output device;

b) storing printing job information on characters suitable for the display capability of the printing job information display section, in the printing data supply device, according to a user's operation;

c) comparing printing job information manually or automatically inputted in the setting environment with the display capability information received by the printing data supply device in the step a); and d) converting the inputted printing job information to the stored printing job information stored in the step b) when the printing job information is inputted with characters not suitable for the display capability of the printing job information display section.

According to the above invention, the display capability information of the printing job information display section of the printing output device is received in the printing data supply device, and printing job information on characters suitable for the display capability of the above printing job information display section is stored at the above printing data supply device, according to the user's operation, beforehand. Then, printing job information manually or automatically inputted is compared with the display capability information received beforehand, and if characters used to input the printing job information are not suitable for the display capability of the printing job information display section, the printing job information inputted in the setting environment is converted to the stored printing job information.

Thus, the user can set printing job information at the printing data supply device, using characters suitable for the display capability of the display device (printing job information display section) of the printing output device, without correcting unsuitable characters one by one.

For a fuller understanding of the nature and advantages of the invention, reference should be made to the ensuing detailed description taken in conjunction with the accompanying drawings.

BRIEF DESCRIPTION OF THE DRAWINGS

FIG. 4 is an explanatory view showing the first user interface screen shown when the functions shown in FIG. 1 are performed in a second embodiment.

DESCRIPTION OF THE EMBODIMENTS

Figure 1:
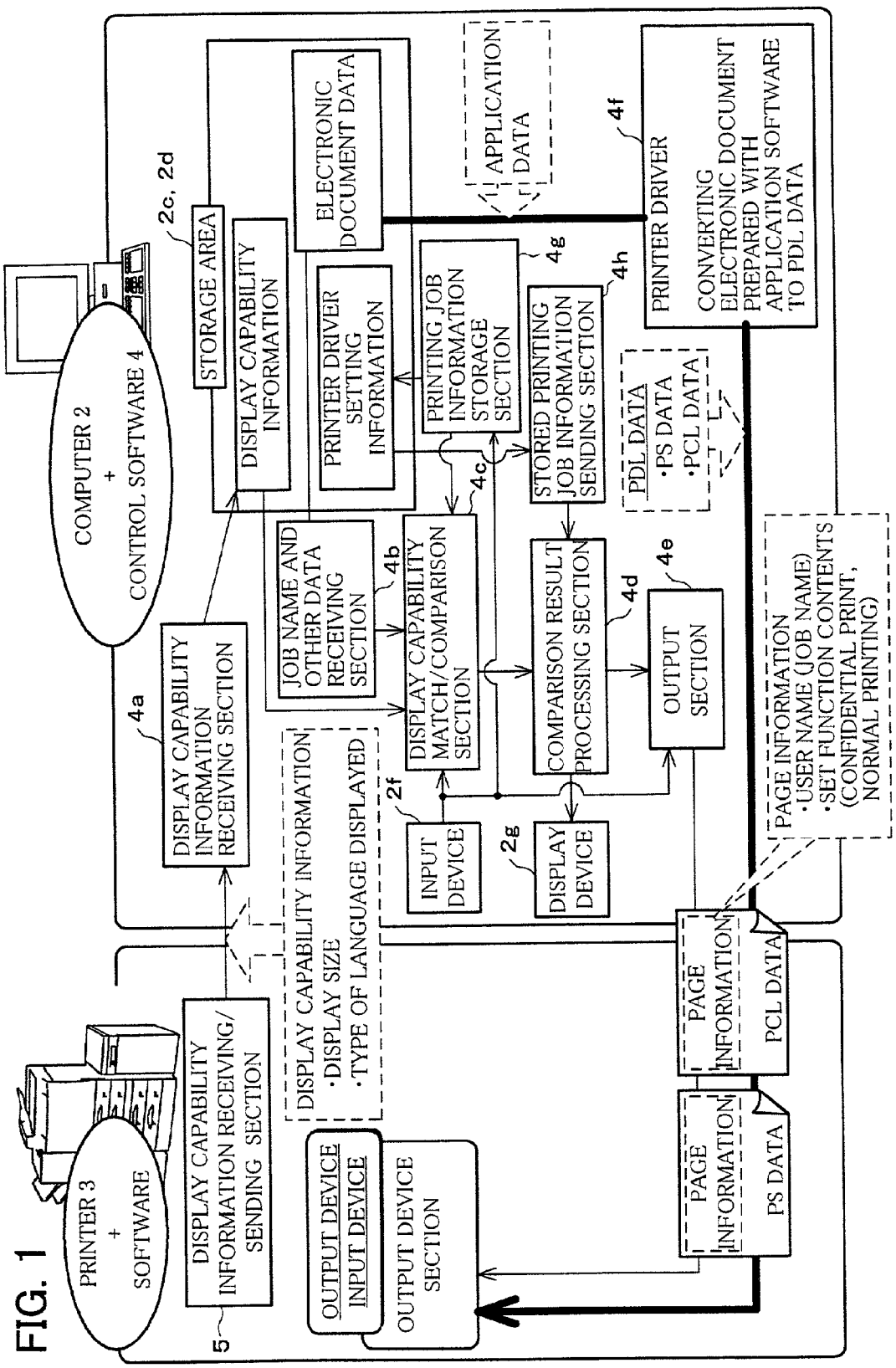
FIG. 1 is a block diagram explaining functions of a printing data supply device in which software which conducts a printing output user interface control method in accordance with the embodiments of the present invention is installed.

Referring to the drawings, the following description will describe the embodiments of the present invention.

Figure 13:
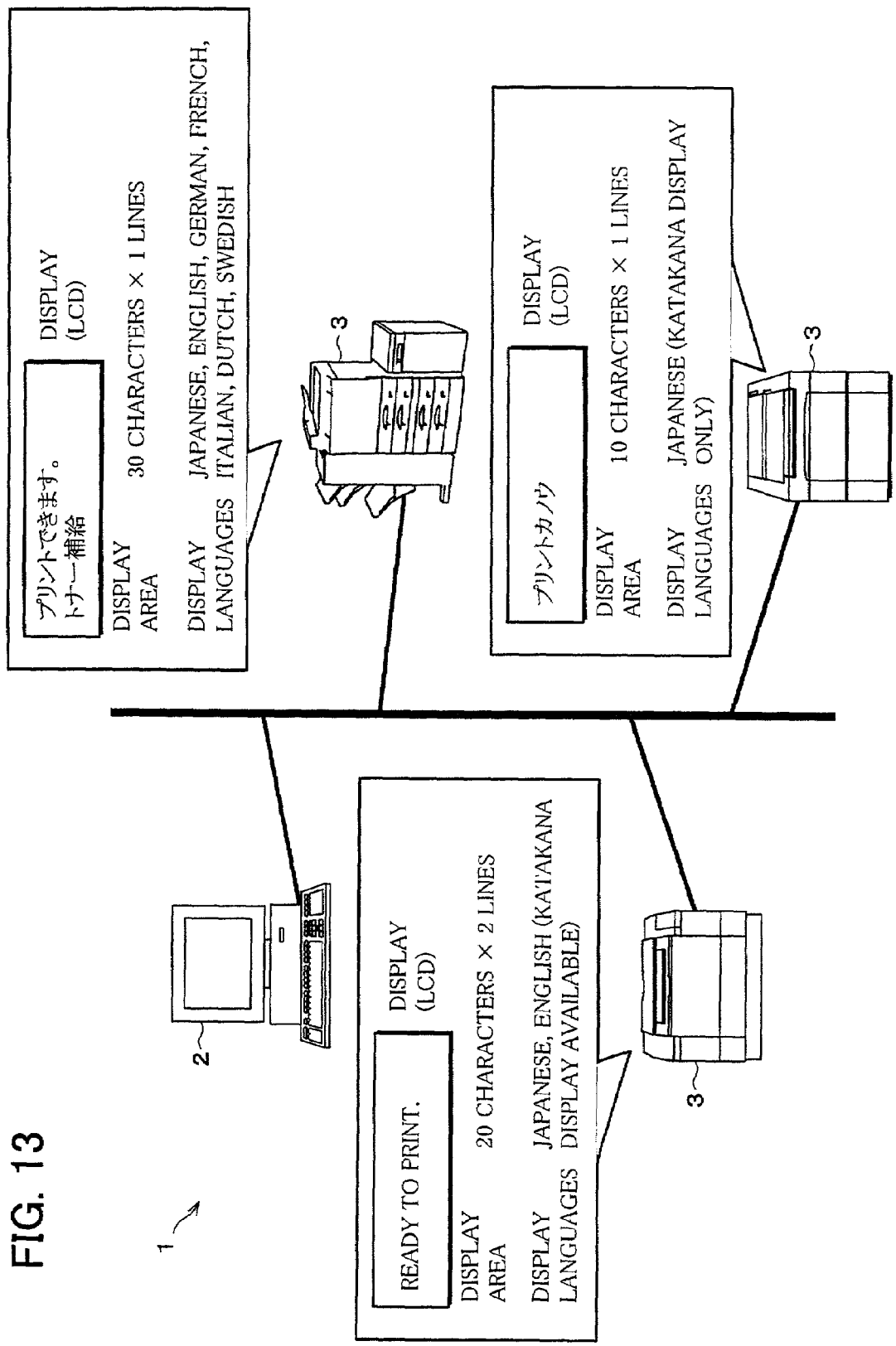
FIG. 13 is an explanatory view showing a configuration of a network forming an information processing system according to the embodiments of the present invention or conventional structure.

An information processing system to which a printing output user interface control method in accordance with the present embodiments is applied is formed in a network configuration similar to the foregoing information processing system 1 of FIG. 13, and a computer 2 such as a personal computer and a workstation is used as a printing data supply device, and a printer 3 such as a copying machine and a laser printer is used as a printing data output device. A copying machine equipped with a computer having the similar capabilities as the above computer 2 can also be used as a printing data supply device.

Figure 2:
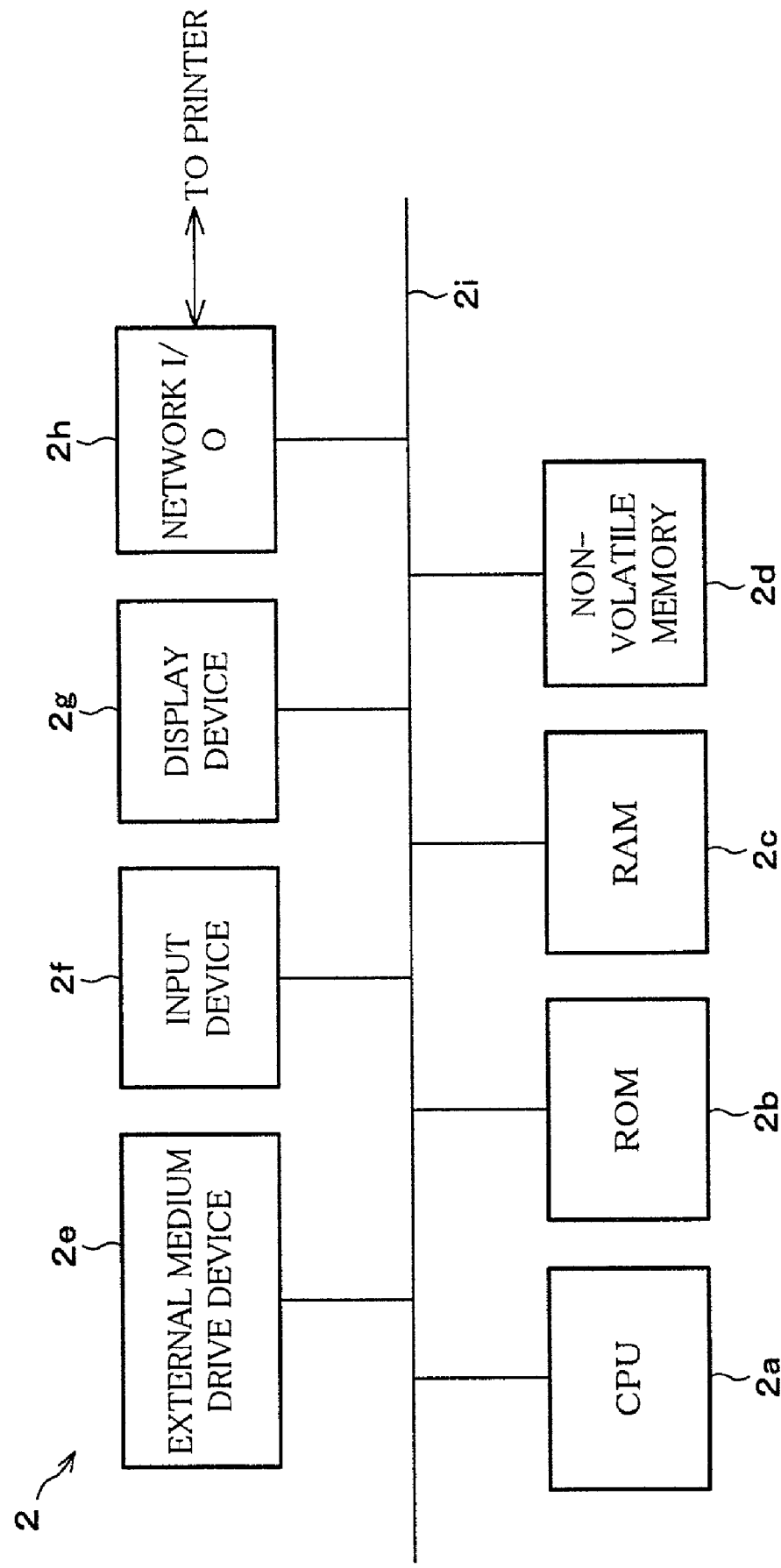
FIG. 2 is a block diagram showing a configuration of the printing data supply device in accordance with the embodiments of the present invention.

FIG. 2 shows a configuration of the computer 2 used as a printing data supply device in the above information processing system 1. As shown in the figure, the computer 2 includes a CPU 2a, a ROM 2b, a RAM 2c, a readable/writable non-volatile memory 2d such as a hard disk or a flash memory, an external medium drive device 2e for driving an external medium such as an optical disk or an IC card, an input device 2f made up of a keyboard or a mouse, etc., a display device (user interface display section) 2g made up of a LCD display, a CRT, a plasma display, or an EL (Electro Luminescence) display, and a network I/O (Input/Output) 2h serving as an interface to the above network, and all of these are on a bus 2i. In addition, the printer 3 similarly configured as in FIG. 14 can be used as a printing output device connected to the computer 2.

In the non-volatile memory 2d of the above computer 2 stored is control software 4 which has a program to conduct the printing output user interface control method of the present embodiments by being incorporated in the configuration of the above computer 2. The control software 4 may contain a printer driver for the above printer 3 internally, or may be supplied as another software apart from a printer driver. The following will explain a case in which the control software 4 includes a printer driver. In the computer 2, when printing data prepared by an application software package is supplied to the printer 3 by the printer driver, the control software 4 controls user input setting support in printing job information settings, for a user interface which provides a printing-related information setting environment on the display device 2g, so that printing job information is displayed on a display device 3c of the printer 3 with characters suitable for the display capability of the display device.

Respective functions implemented by installing the control software 4 in the computer 2 are shown in a block diagram of FIG. 1. In this example of FIG. 1, the computer 2 includes as a basic configuration a display capability information receiving section 4a, a job name and other data receiving section 4b, a display capability match/comparison section 4c, a comparison result processing section 4d, an output section 4e, and a printer driver 4f. For further function implementation, a printing job information storage section 4g and a stored printing job information sending section 4h are added to the basic configuration. In all the above function blocks, the CPU 2a is combined with each program of the control software 4 to control each process in the embodiments described later.

Further, the following will show the examples of programs of the control software 4 which are combined with the CPU 2a in each function block. In the display capability information receiving section 4a, the CPU 2a is combined with stored programs of the RAM 2c, the nonvolatile memory 2d, and the network I/O 2h. In the job name and other data receiving section 4b, the CPU 2a is combined with stored programs of the RAM 2c and the nonvolatile memory 2d. In the display capability match/comparison section 4c, the CPU 2a is combined with stored programs of the RAM 2c and the input device 2f. In the comparison result processing section 4d, the CPU 2a is combined with stored programs of the RAM 2c and the display device 2g. In the output section 4e, the CPU 2a is combined with stored programs of the RAM 2c, the nonvolatile memory 2d, and the network I/O 2h. In the printer driver 4f, the CPU 2a is combined with stored programs of the RAM 2c and the non-volatile memory 2d. In the printing job information storage section 4g, the CPU 2a is combined with stored programs of the RAM 2c, the non-volatile memory 2d, and the input device 2f. In the stored printing job information sending section 4h, the CPU 2a is combined with stored programs of the RAM 2c and the non-volatile memory 2d.

Figure 14:
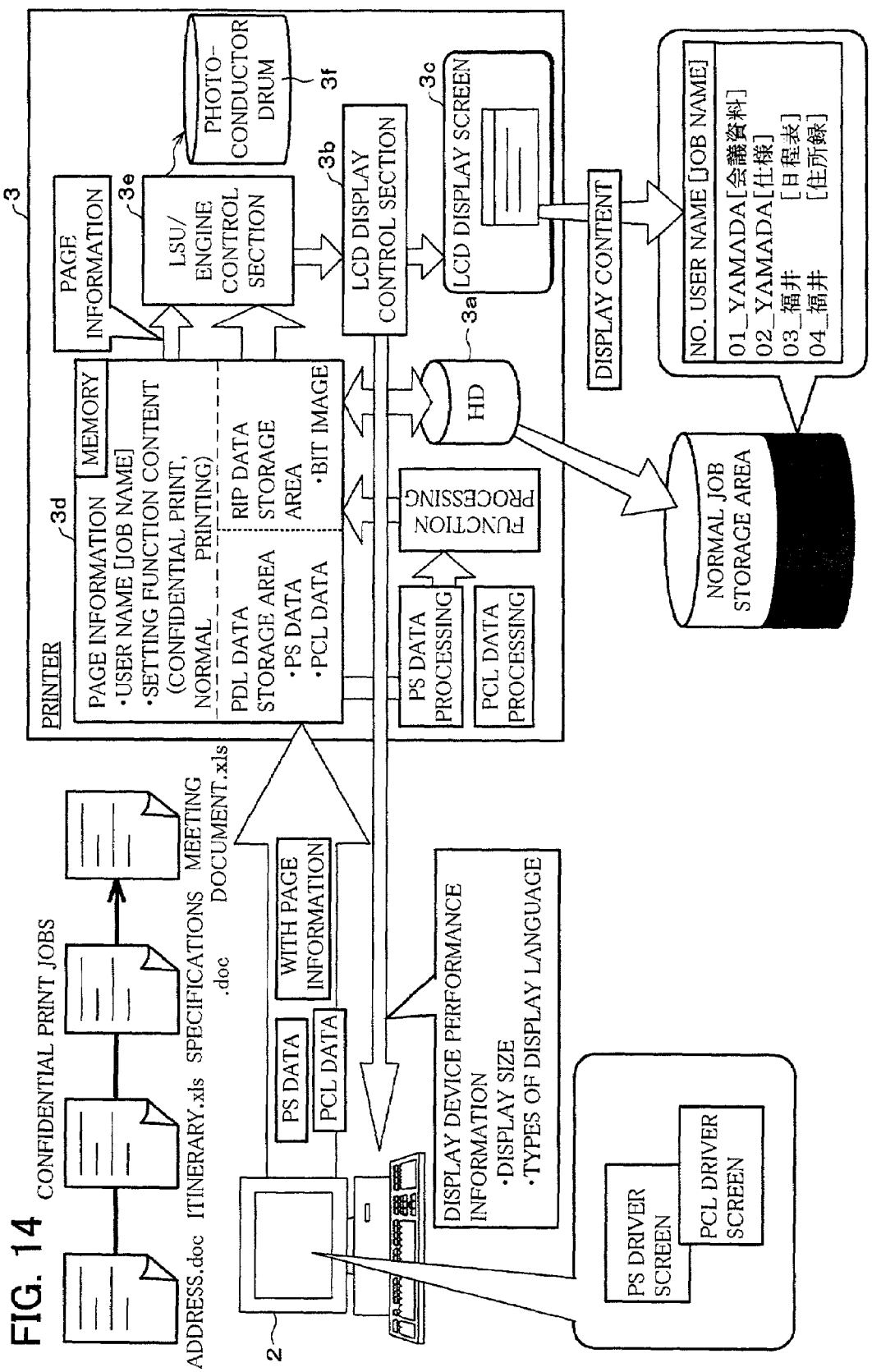
FIG. 14 is an explanatory view showing a configuration and functions of a printing output device according to the embodiments of the present invention or conventional structure.
Figure 15:
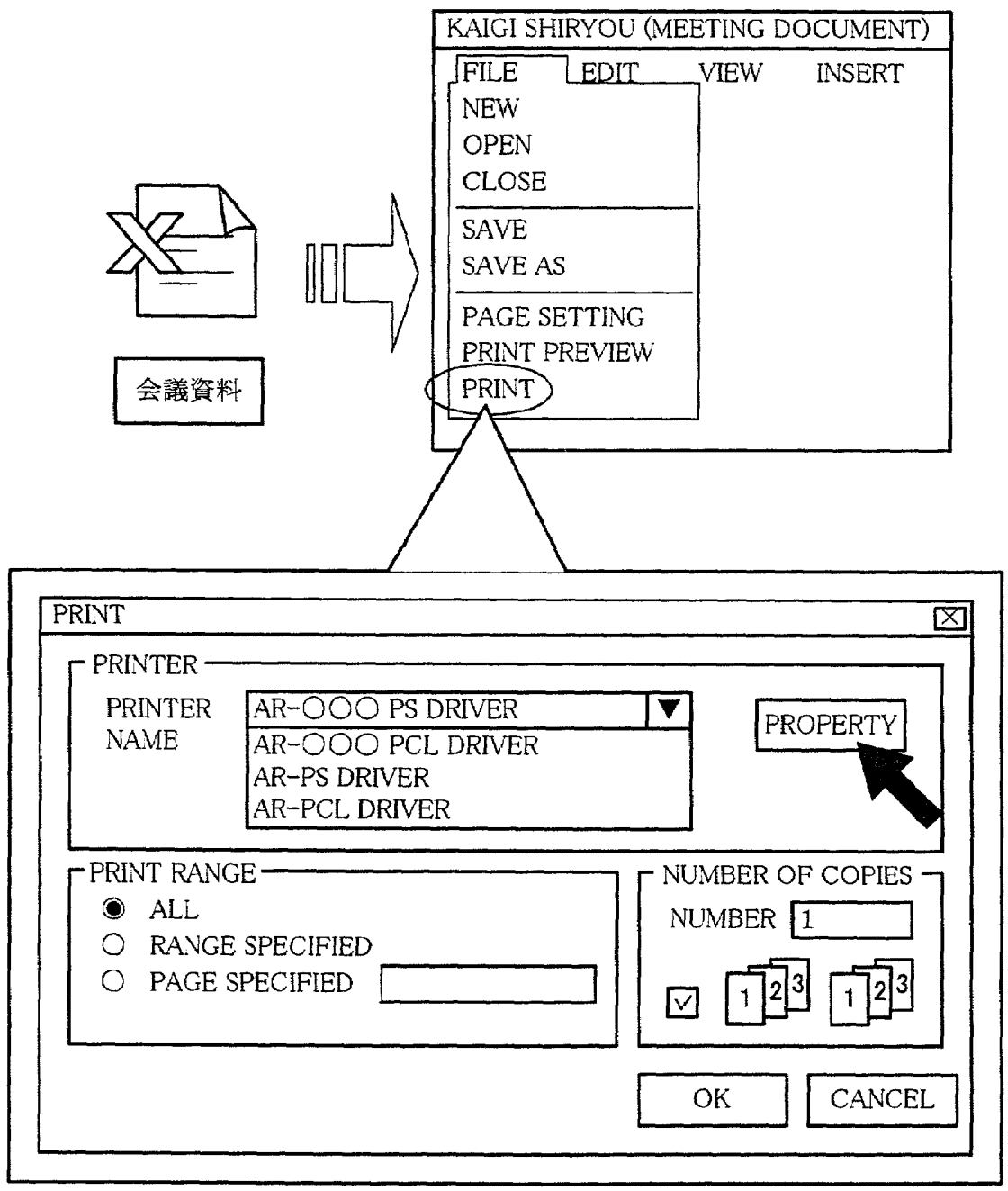
FIG. 15 is an explanatory view showing the first conventional user interface screen.
Figure 16:
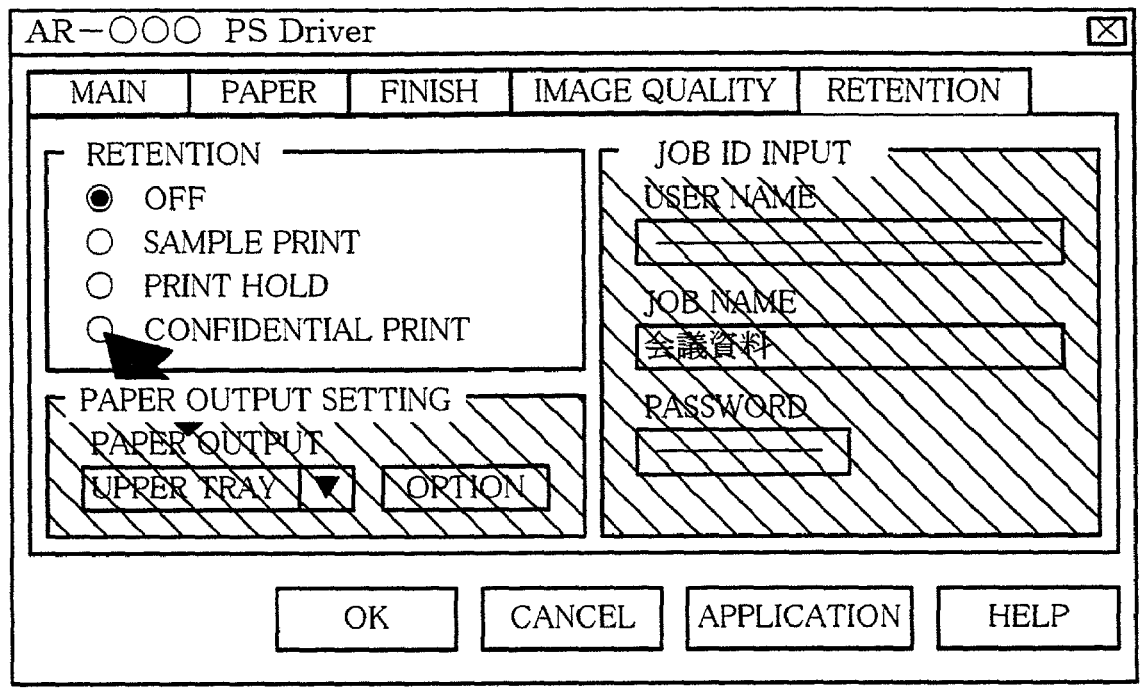
FIGS. 16(a) and 16(b) are explanatory views showing the second conventional user interface screens.
Figure 16:
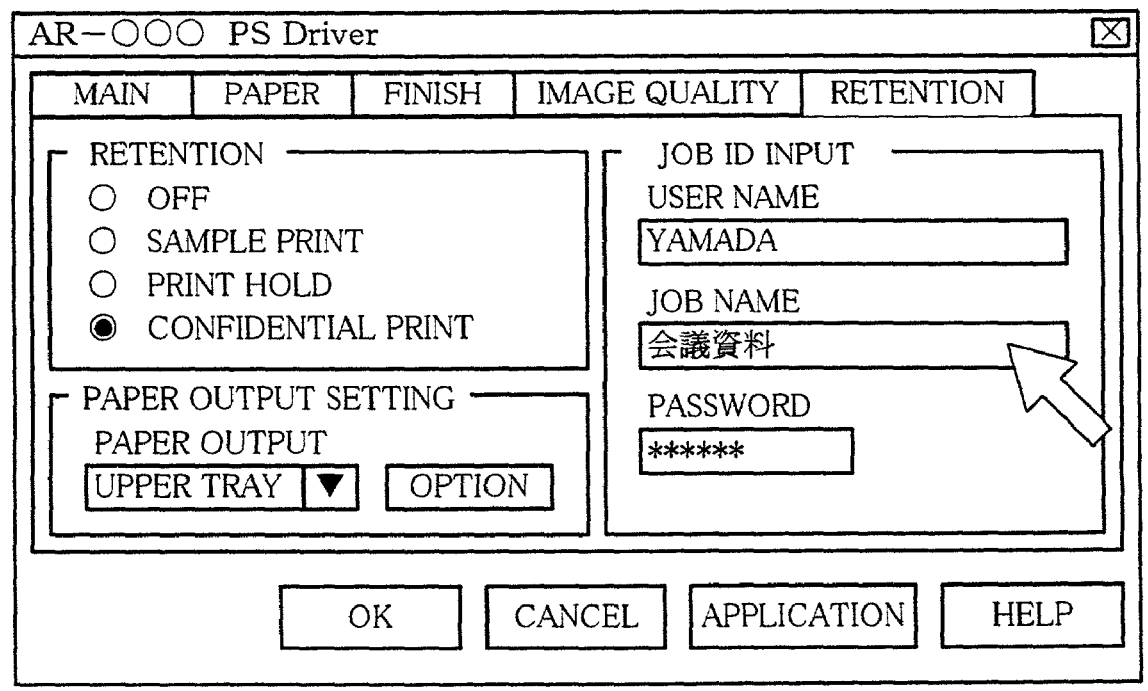
Figure 17:
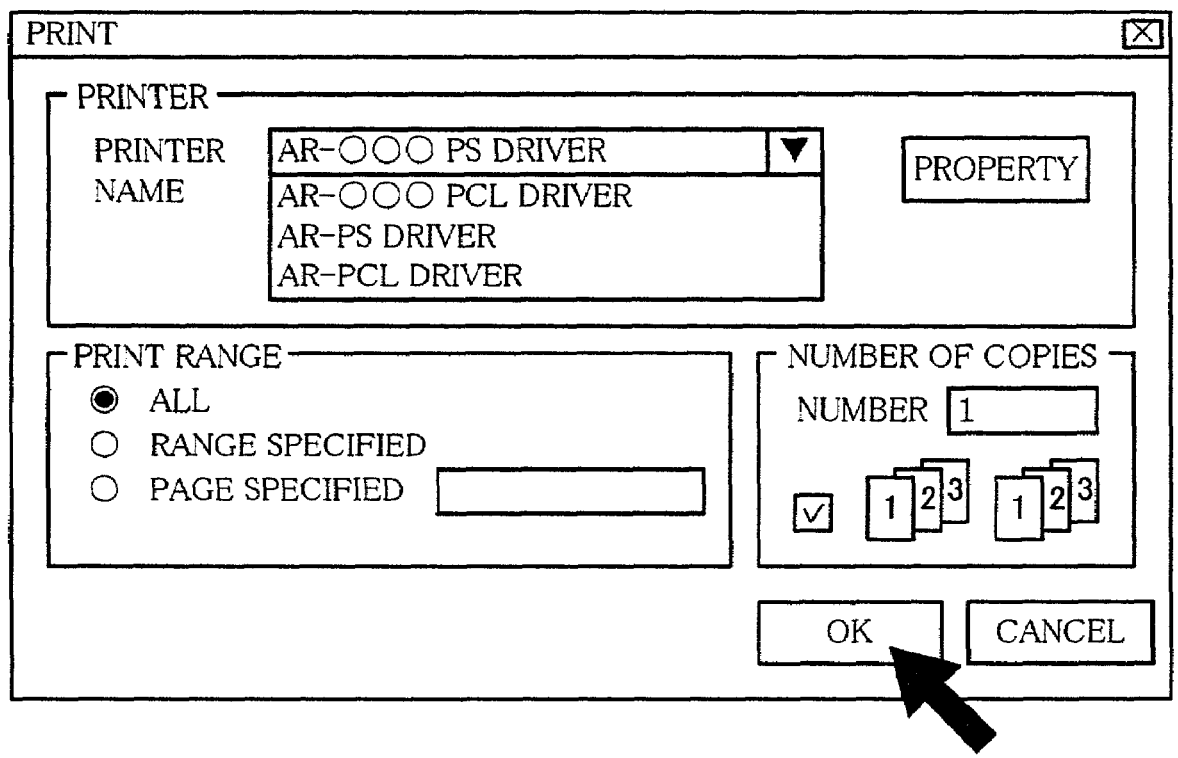
FIG. 17 is an explanatory view showing the third conventional user interface screen.
Figure 18:
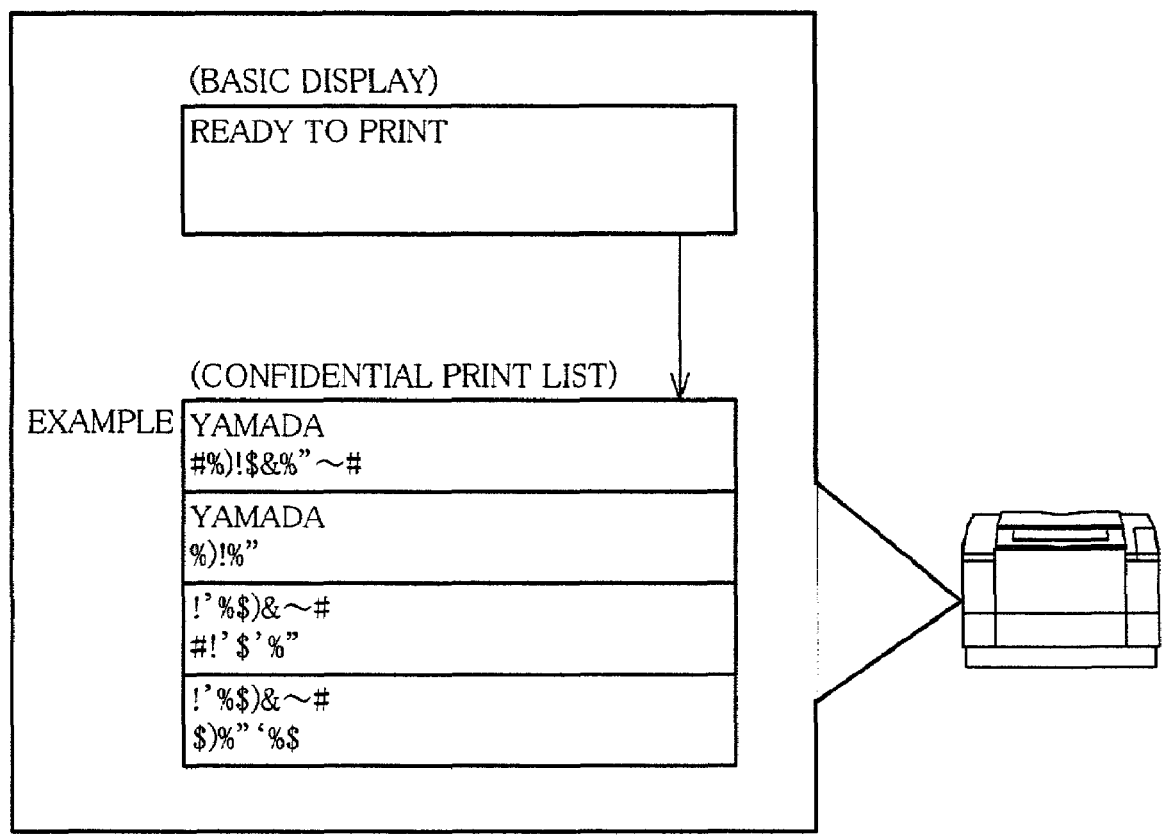
FIG. 18 is an explanatory view showing a display screen of a display device of a conventional printing output device.

In addition, the printer 3 can send display capability information of the display device 3c from a display control section 3b to the computer 2 as shown in FIG. 14, and it has a display capability information receiving/sending section 5 in which a program to control the flow of the display capability information is combined with specified hardware of the printer 3, as shown in FIG. 1. The following will be a specific description of various types of the printing output user interface control method by the control software 4.

First Embodiment

Assume that a computer 2 in which control software 4 is installed has the foregoing basic configuration shown in FIG. 1. A display capability information receiving section 4a conducts an information receiving process, in which the section requests a display capability information receiving/sending section 5 of a printer 3 beforehand via a network I/O 2h to send display capability information (such as display size and the types of displayable languages) of a display device 3c and receives the display capability information, and stores the data at a storage area in the computer 2 made up of a RAM 2c and an non-volatile memory 2d. To supply printing data from the computer 2 to the printer 3, a user boots a user interface by clicking the Print button or by other measures to set printing-related information at a display device 2g, and invokes a setting environment. When a printer driver setting screen is opened under the setting environment, boxes for inputting a user name and a printing job name as printing job information are shown on the screen. The user can manually input the user name and the printing job name via an input device 2f to indicate them. Besides, the log-in name and the file name on the application software used to prepare the printing data can also be used as the user name and the printing job name, respectively, and they can be obtained from electronic document data in the above storage area via a job name and other data receiving section 4b and automatically indicated in the input boxes.

A display capability match/comparison section 4c conducts a comparison process, in which the section compares the user name and the printing job name manually or automatically inputted with the display capability information which is already received by the display capability information receiving section 4a and is read from the storage area, and checks if the indication of the names matches the display capability. For example, when the user name and the printing job name are automatically obtained by the job name and other data receiving section 4b, and the type of the Japanese characters used to input the names does not match the display capability of the display device 3c of the printer 3, in such a manner that the log-in name of the computer 2 is set as "Fukui"(a person's name) in Japanese kanji and the file name of the printing job is set as "Nitteihyou" (Itinerary) in Japanese kanji, the inputted user name and printing job name are judged as not suitable for the display capability. The same judgment is made when the user manually inputs the user name and the printing job name as "Fukui" and "Nitteihyou" in Japanese kanji.

Figure 3:
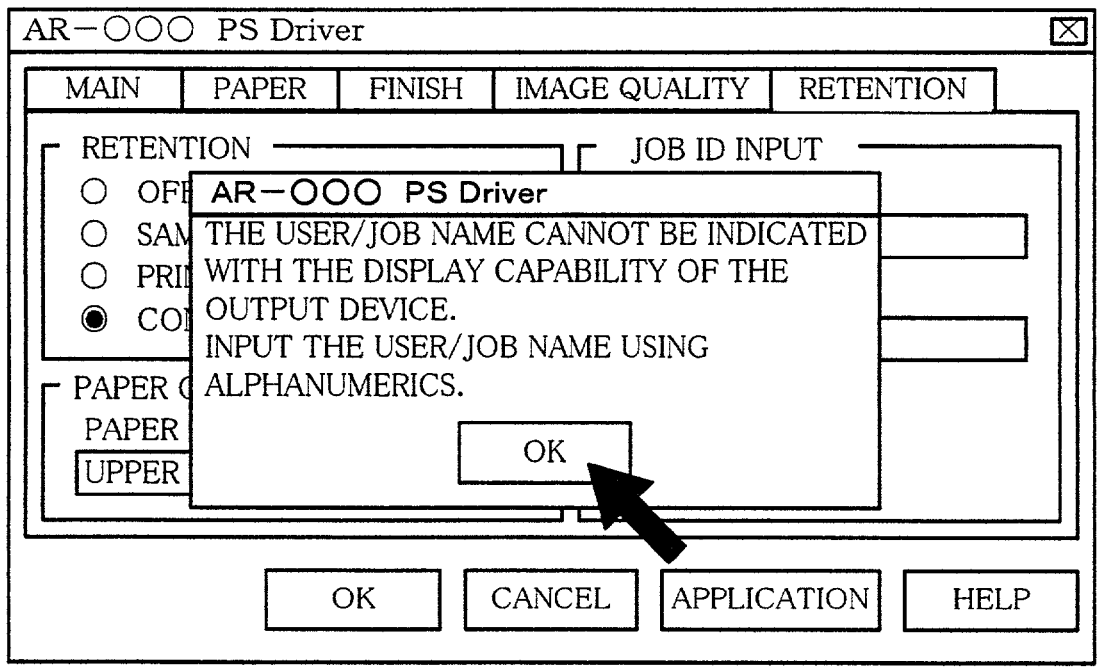
FIGS. 3(a) and 3(b) are explanatory views showing user interface screens shown when the functions shown in FIG. 1 are performed in a first embodiment.
Figure 3:
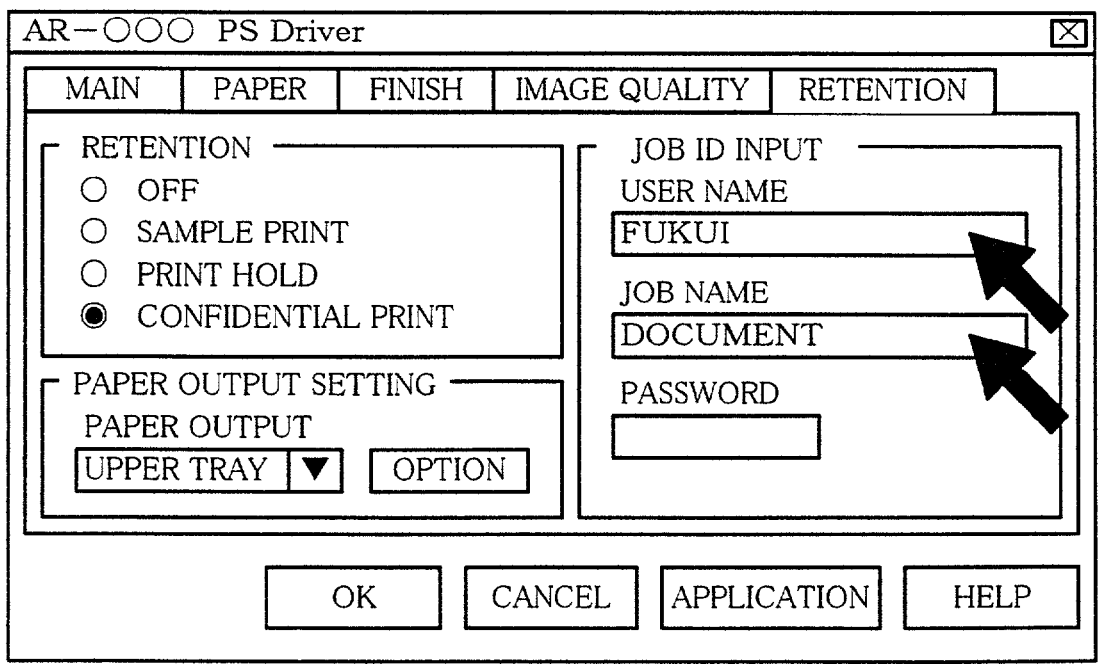

An comparison result processing section 4d receives the above comparison result, and indicates the user name and the printing job name in the input boxes if they match the display capability, or makes the boxes remain blank without indication if they do not match the display capability. Further, when they do not match the display capability, the comparison result processing section 4d conducts a notifying process, in which the section makes the display device 2g indicate messages such as "The user/job name cannot be indicated with the display capability of the output device." and "Input the user/job name using alphanumerics.", as shown in FIG. 3(a), to notify the user to input the names using characters suitable for the display capability. Such information is not limited to the indication on the display device 2g but may be provided in the form of voice announcement.

When Japanese characters are not accepted as mentioned above, the user follows the direction and inputs the user name and the printing job name as "FUKUI" and "DOCUMENT", respectively, in the input boxes as shown in FIG. 3(b). Then the user name and the printing job name are indicated and fixed. When settings for other function contents such as those for the confidential print function or for normal printing are completed, an output section 4e outputs the user name, the printing job name and the set function contents, and a printer driver 4f converts the printing data received from the application software into PDL data such as PS data and PCL data. The control software 4 adds page information including the user name, the printing job name, and the set function contents to such PDL data, and sends the data via a network I/O 2h to the printer 3. Thus, character transformation does not occur on the display device 3c of the printer 3, and the user can easily recognize on the display device 3c which printing job is the one the user desires.

Thus, in the first embodiment, the user can set printing job information at the printing data supply device, using characters suitable for the display capability of the display device of the printing output device.

Second Embodiment

A computer 2 in accordance with the present embodiment in which control software 4 is installed has a printing job information storage section 4g and a stored printing job information sending section 4h in addition to the basic configuration shown in FIG. 1. Hereinafter, like components are labeled with like reference numerals with respect to the first embodiment, and the description of these components is not repeated for ease of explanation.

In this embodiment, after the display capability information receiving section 4a receives display capability information of the display device 3c beforehand, the printing job information storage section 4g conducts a storage process, in which the section stores printing job information on characters suitable for the above display capability. To store a user name and a printing job name beforehand, the Property screen of the printer driver 4f is chosen in a printing-related information setting environment, as shown in FIG. 4. In this case, the names are manually inputted by a user via the input device 2f. Since characters used to input the names should match the display capability of the display device 3c, the display capability match/comparison section 4c conducts a comparison process, making comparison and judgment in the same way as the comparison process in the first embodiment.

As a result of comparison, if the characters used to input the user name and the printing job name matches the display capability, the user name and the printing job name are indicated unchanged in input boxes. If the characters do not match the display capability, the comparison result processing section 4d notifies the user of the result in the same way as in the first embodiment, and the user corrects the names using characters suitable for the display capability, then the corrected names are indicated in the input boxes. The printing job information is thus fixed and set stored as printer driver setting information, as the printing job information storage section 4g stores the information in a storage area such as a hard disk. FIG. 4 shows an example to store "YAMADA" and "WORK", a user name and a printing job name, respectively, that match the display capability.

In this embodiment, by using the stored printing job information, printing job information inputted with characters not suitable for the display capability of the display device 3c of the printer 3 is automatically converted into the stored printing job information when setting printing-related information to supply printing data to the printer 3. Compared with the first embodiment, in which the user is notified that the characters inputted are not suitable for the display capability and is directed to correct the input, the user doesn't have to correct the characters one by one.

Figure 5:
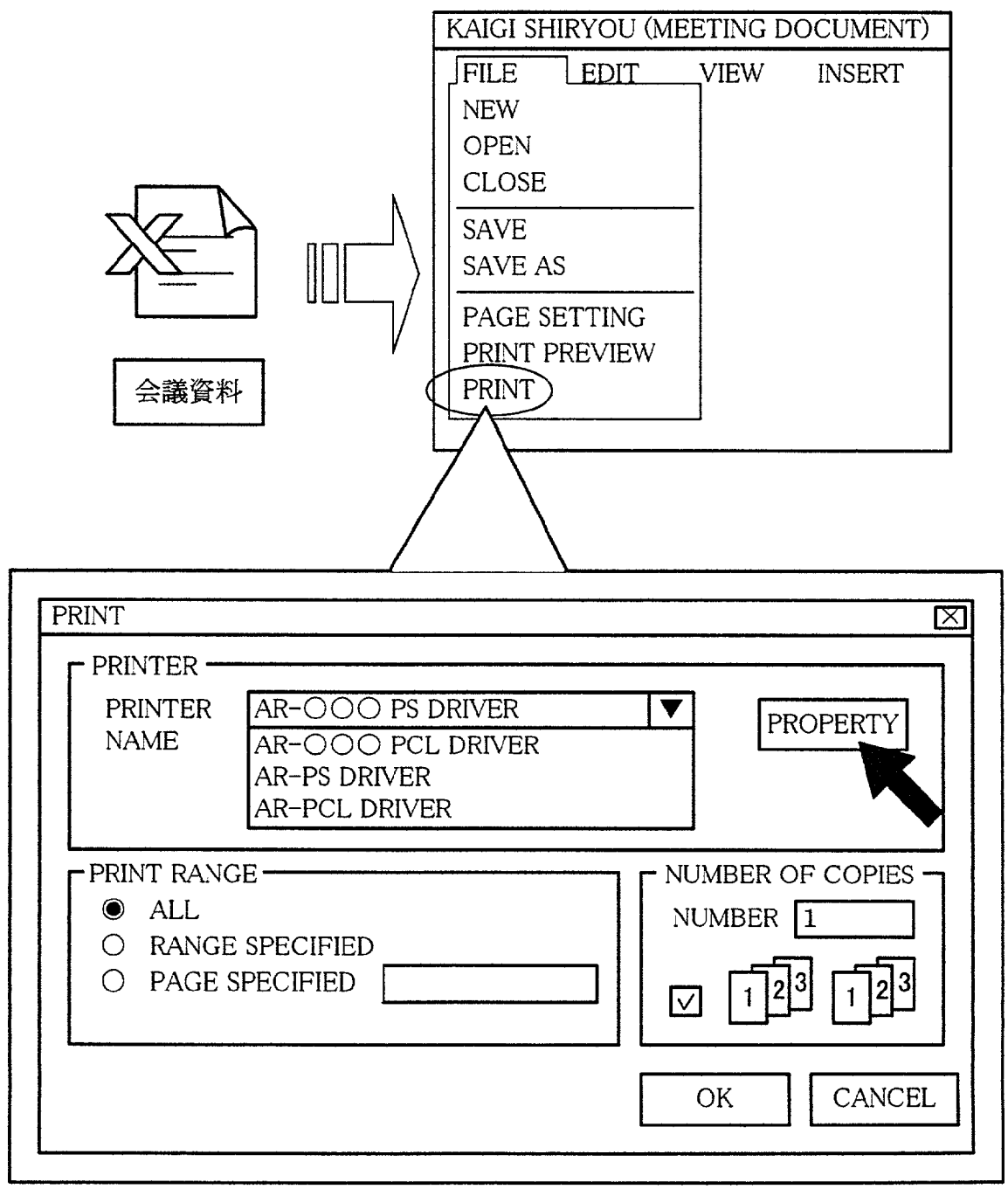
FIG. 5 is an explanatory view showing the second user interface screen shown when the functions shown in FIG. 1 are performed in the second embodiment.
Figure 6:
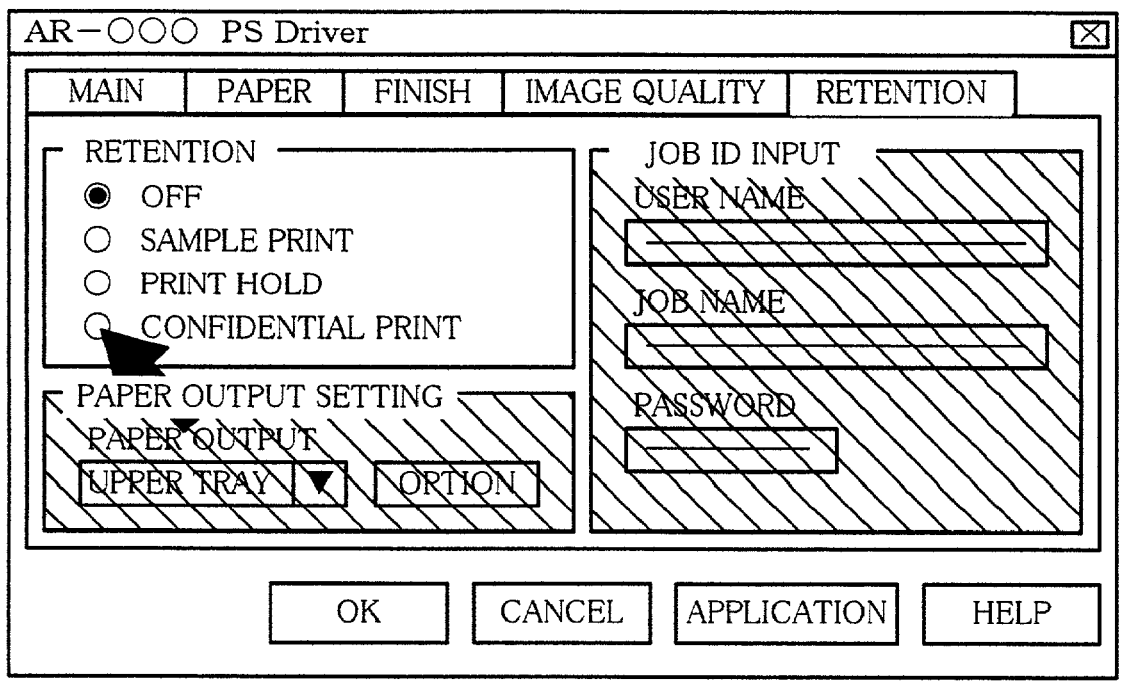
FIGS. 6(a) and 6(b) are explanatory views showing the third user interface screen shown when the functions shown in FIG. 1 are performed in the second embodiment.
Figure 6:
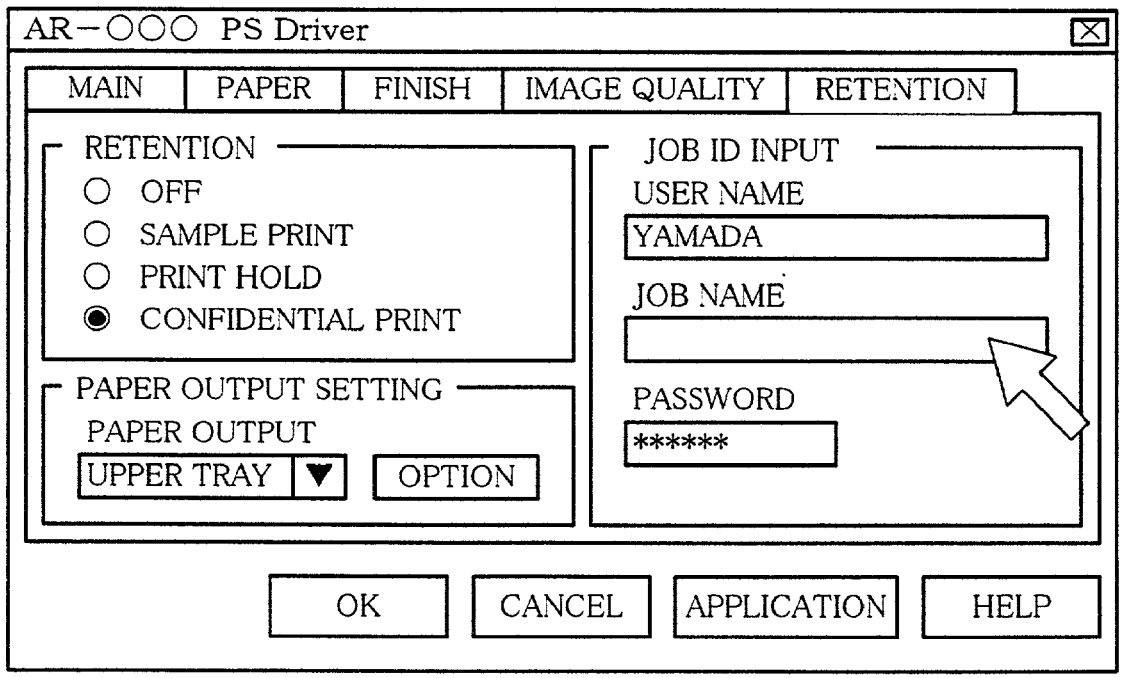
Figure 7:
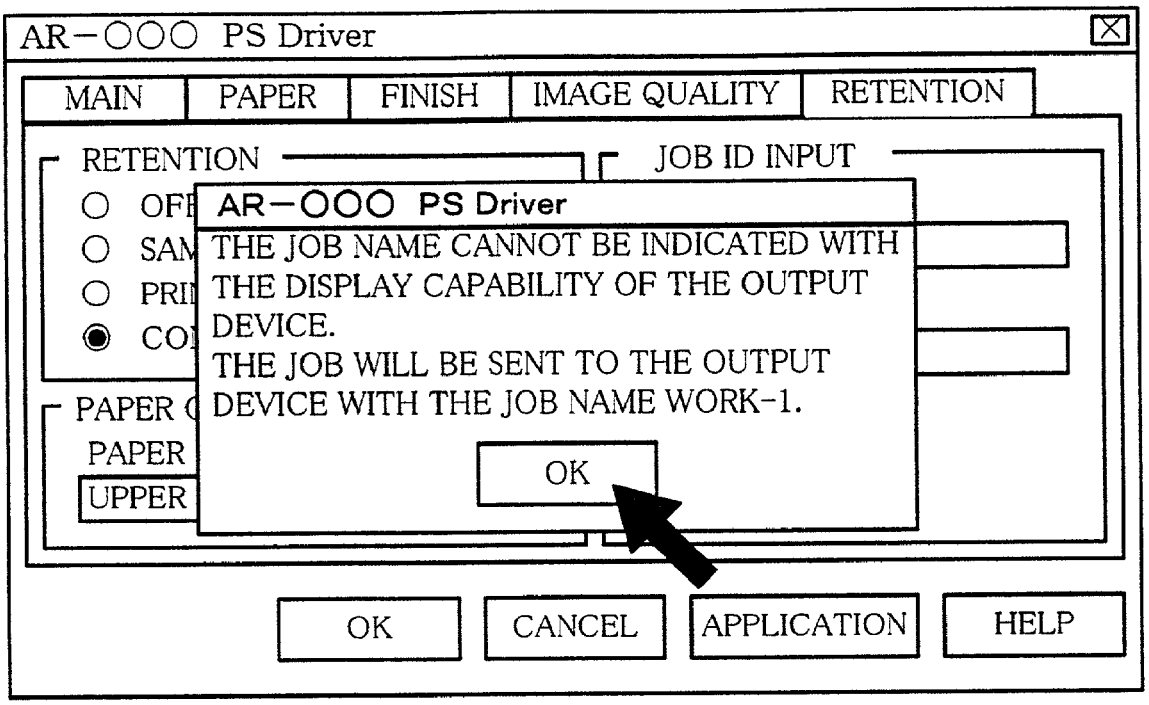
FIGS. 7(a) and 7(b) are explanatory views showing the fourth user interface screen shown when the functions shown in FIG. 1 are performed in the second embodiment.
Figure 7:
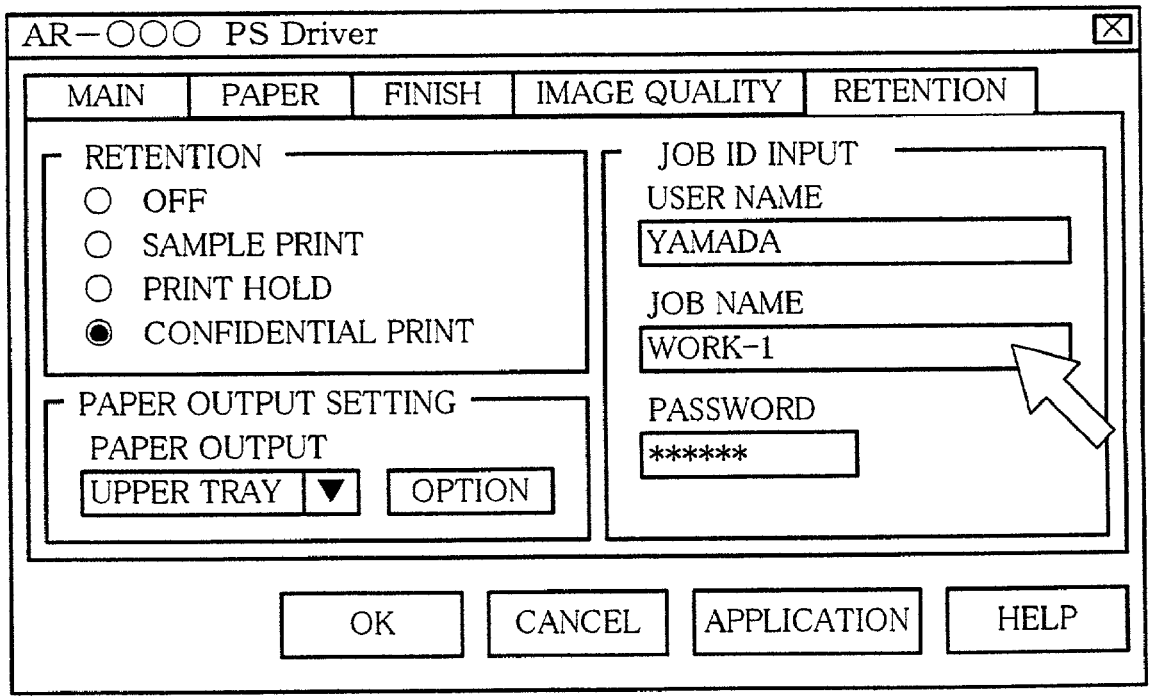

Next, procedures to set printing job information for the confidential print function by the control software 4 of the above configuration will be described using FIGS. 5 through 8. First, as shown in FIG. 5, doubleclick the icon of "Kaigi Shiryou" (Meeting Document) prepared using an application software package to open the file, and click the Print button and boot a user interface to invoke a printing-related information setting environment. Choose Property on the screen and open a printer driver setting screen as shown in FIG. 6(a). Choose the tag for Retention Print and check the radio button for Confidential Print in the figure, then a user name "YAMADA", which is already obtained from the log-in name "YAMADA" of the computer 2 by the job name and other data receiving section 4b, and a printing job name "Kaigi Shiryou" (Meeting Document), which is obtained from the file name "Kaigi Shiryou" in Japanese kanji on the application software, are indicated in the Job ID Input section on the screen. However, if Japanese is not suitable for the display capability, the printing job name is judged as not suitable for the display capability in the comparison process of the display capability match/comparison section 4c, and while "YAMADA" is indicated in a box for showing the user name as shown in FIG. 6(b) by the comparison result processing section 4d, a box for showing the printing job name remains blank.

Here, the stored printing job information sending section 4h reads out "WORK", the printing job name of the stored printing job information, from the foregoing storage area, and the comparison result processing section 4d converts the characters inputted in the box for the printing job name in the Job ID Input section on the screen from "Kaigi Shiryou" to "WORK", and indicates "WORK" on the display device 2g. Here, "WORK" may be fixed and used as the printing job name, but if the same user supplies another printing job to the printer 3 after that, since only one kind of the printing job name is stored, there is a possibility that a plurality of printing jobs with the same user name and printing job name might be supplied using the stored printing job name. Thus, there may be cases where it is difficult for the user to distinguish each of the user's jobs on the display device 3c of the printer 3.

To cope with such cases, the comparison result processing section 4d numbers a plurality of printing job information to show the processing sequence when converting unsuitable printing job information to the stored printing job information in its conversion process, and further converts the display contents of the stored printing job information. In this case, for example, the first printing job "WORK" is converted to "WORK-1", and the second job "WORK" is converted to "WORK-2". Or, "WORK" may be left unchanged and the user name "YAMADA" may be converted to "YAMADA-1" and "YAMADA-2". The numbers added to the names are automatically counted up by the comparison result processing section 4d. In addition, not only numbers but alphabets, symbols that can show the sequence, the times when printing jobs are issued, and the like may be used to convert the display content so that the user can distinguish each of the plural printing jobs. Thus, even only one stored printing job information can handle plural printing jobs.

Since it may make the user confused if the printing job name is automatically converted by the above numbering and is used without notice, the comparison result processing section 4d shows a pop-up display on the printer driver setting screen as shown in FIG. 7(a) in its conversion process, and indicates a message like "The job name cannot be indicated with the display capability of the output device." and a notice such as "The job will be sent to the output device with the job name WORK-1", prompting the user to confirm the conversion of the printing job information. The user confirms that the printing job name of the printing job information supplied to the printer 3 is "WORK-1", and presses the "OK" button if it is OK, or presses the "Job Name Change" button if the user wants to set another printing job name, and inputs another printing job name using alphanumerics. Thus, the printing job information is fixed as shown in FIG. 7(b).

Figure 8:
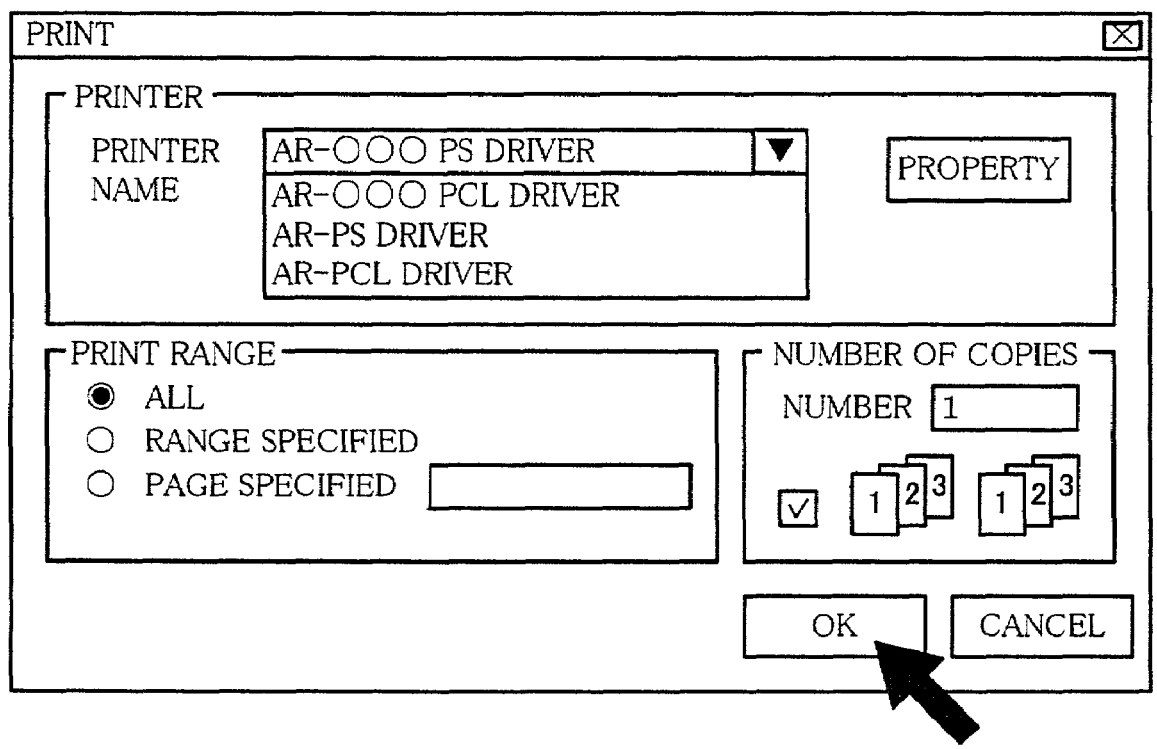
FIG. 8 is an explanatory view showing the fifth user interface screen shown when the functions shown in FIG. 1 are performed in the second embodiment.
Figure 9:
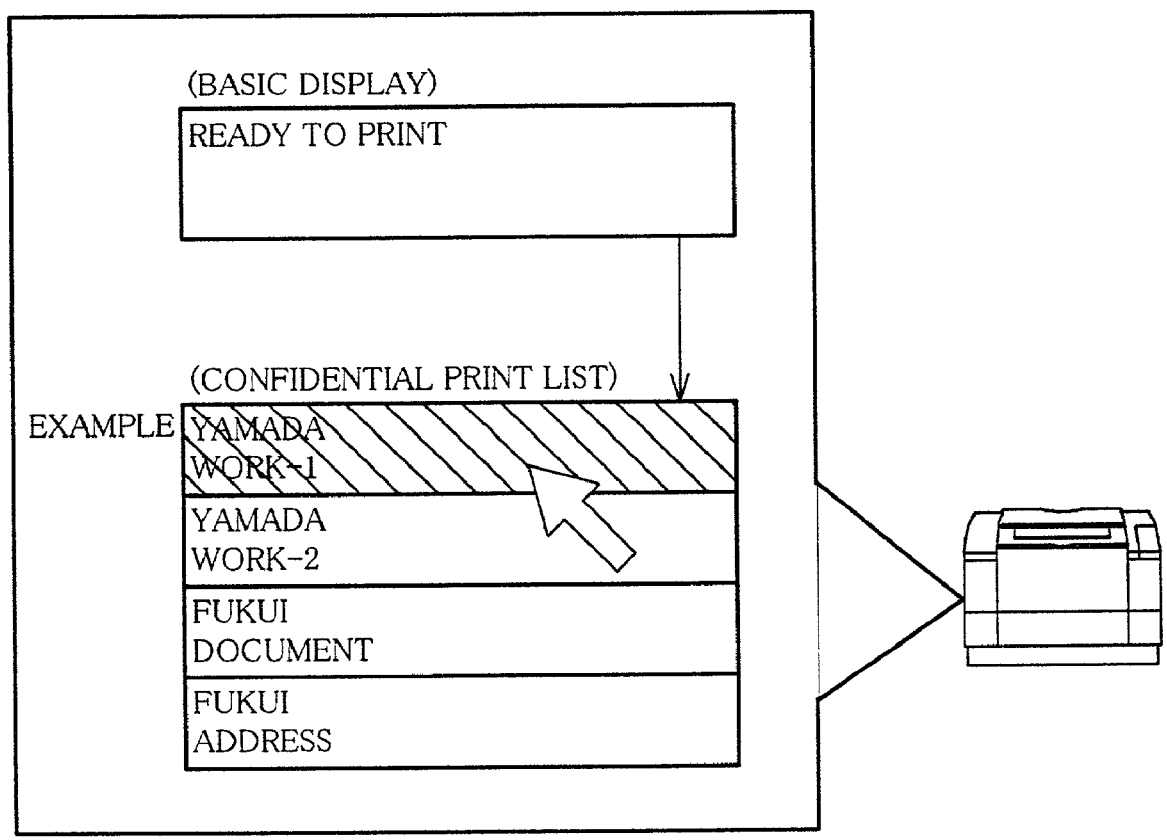
FIG. 9 is an explanatory view showing a display screen of a display device of a printing output device shown when the functions shown in FIG. 1 are performed in the second embodiment.

Then, the screen goes back to the Print screen as shown in FIG. 8, and when the user presses the "OK" button, page information from the output section 4e is added to PDL data from the printer driver 4f and supplied to the printer 3. As a result, as shown in FIG. 9, character transformation does not occur on the display device 3c of the printer 3, and "WORK-1" is indicated as the printing job name, so the user can easily recognize on the display device 3c which printing job is the one the user desires.

Third Embodiment

Assume that a computer 2 in which control software 4 is installed has the same configuration as that in a second embodiment, but that the printing job information storage section 4g stores a plurality of printing job information in its storage process. Also assume that the desired printing job information is chosen among the stored plural pieces of printing job information when printing job information is inputted with characters not suitable for the display capability of the display device 3c of the printer 3 in printing-related information settings. In this embodiment, since a user does not have to correct the inputted characters one by one and more types of printing job information are available for conversion, printing job information can be converted according to the type of a printing job.

Hereinafter, like components are labeled with like reference numerals with respect to the first and second embodiments, and the description of these components is not repeated for ease of explanation.

Figure 10:
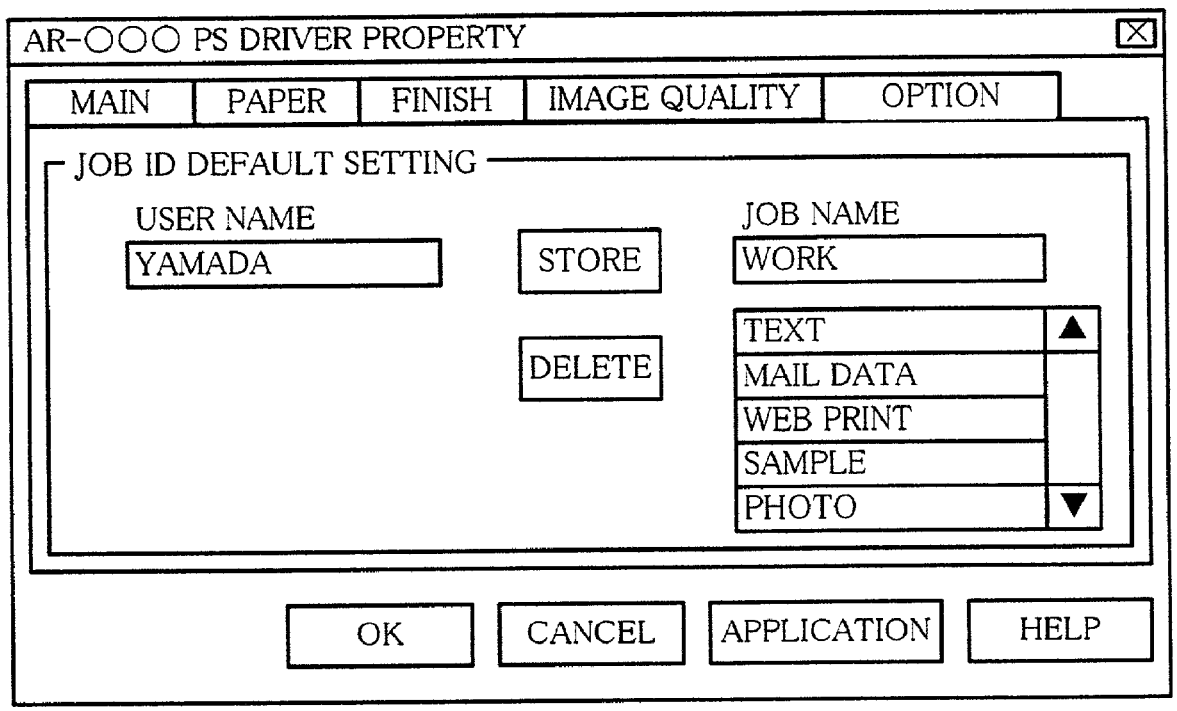
FIG. 10 is an explanatory view showing the first user interface screen shown when the functions shown in FIG. 1 are performed in a third embodiment.

As shown in FIG. 10, the Property screen of the printer driver 4f is opened in a printing-related information setting environment, and a user name and a printing job name are stored beforehand. In the figure, plural printing job names are stored as printing job information for conversion, in order to be selected according to the type of a printing job such as text prepared with a word processor or mail data. In addition, plural user names can be stored to cope with the need for using a user name different from the log-in name. In the storage process, the display capability match/comparison section 4c makes comparison and judgment in the same way as the comparison process in the second embodiment.

Figure 11:
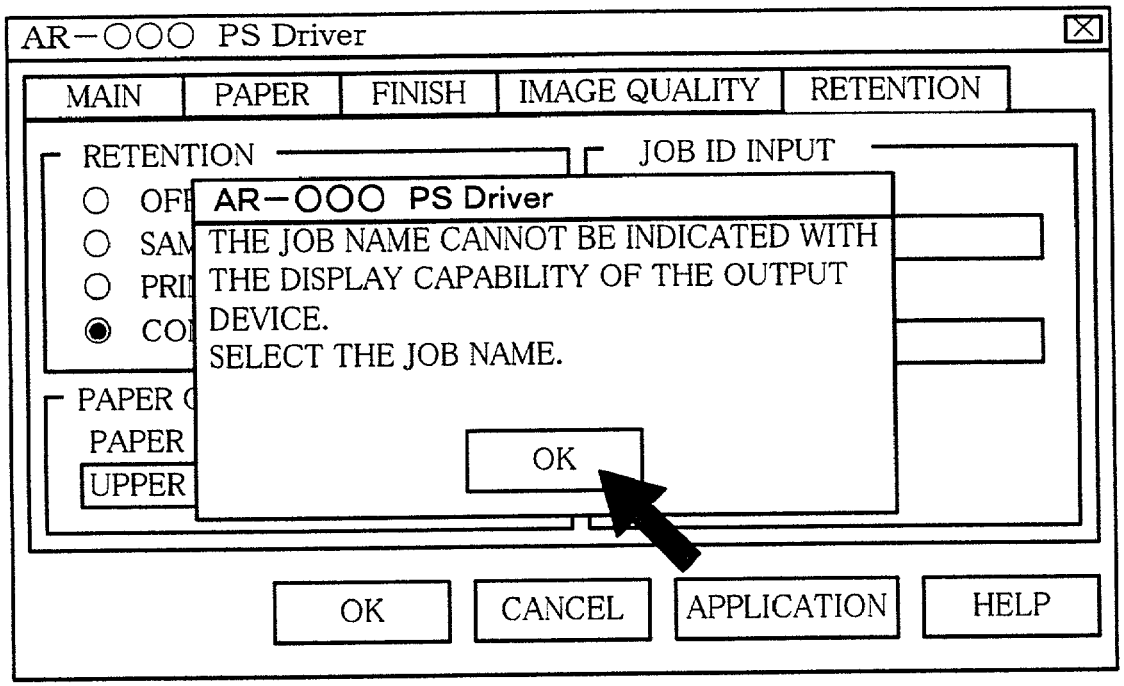
FIGS. 11(a) and 11(b) are explanatory views showing the second user interface screen shown when the functions shown in FIG. 1 are performed in the third embodiment.
Figure 11:
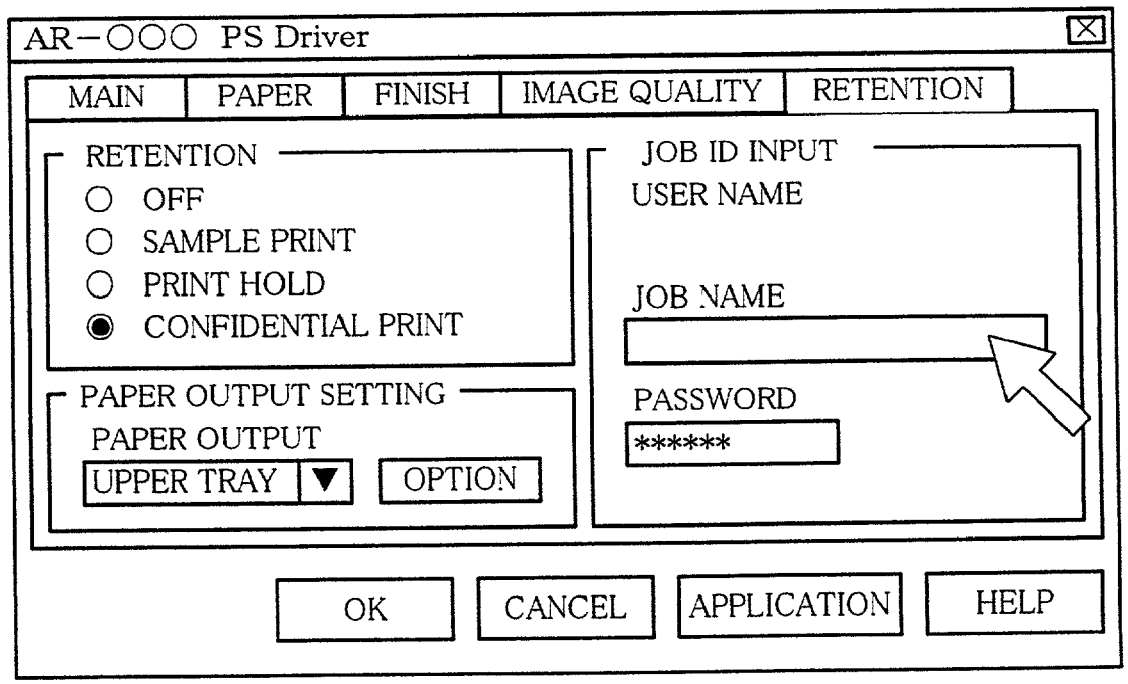

If a printing job name is inputted with characters not suitable for the display capability of the display device 3c of the printer 3 on a printer driver setting screen, the comparison result processing section 4d makes a box for the printing job name on the screen remain blank in its conversion process. Then, it shows a pop-up display on the printer driver setting screen as shown in FIG. 11(a), and indicates a message like "The job name cannot be indicated with the display capability of the output device." and a notice such as "Choose the job name." on the display device 2g. After pressing the "OK" button, the user presses a pull-down key provided in the box for the printing job name, as shown in FIG. 11(b).

Figure 12:
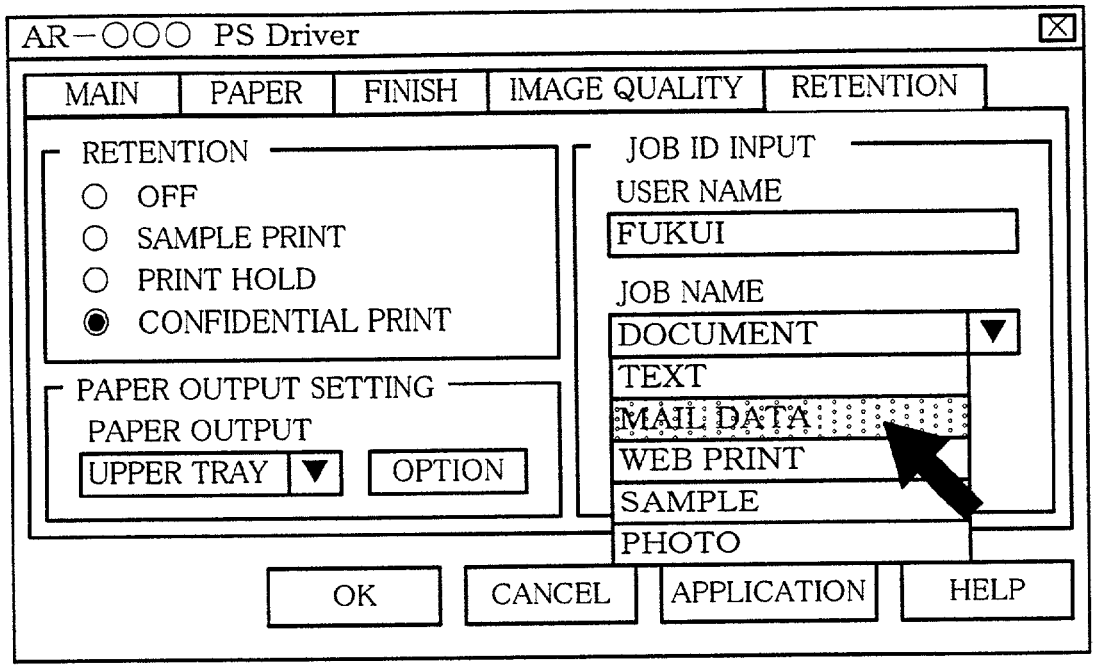
FIGS. 12(a) and 12(b) are explanatory views showing the third user interface screen shown when the functions shown in FIG. 1 are performed in the third embodiment.
Figure 12:
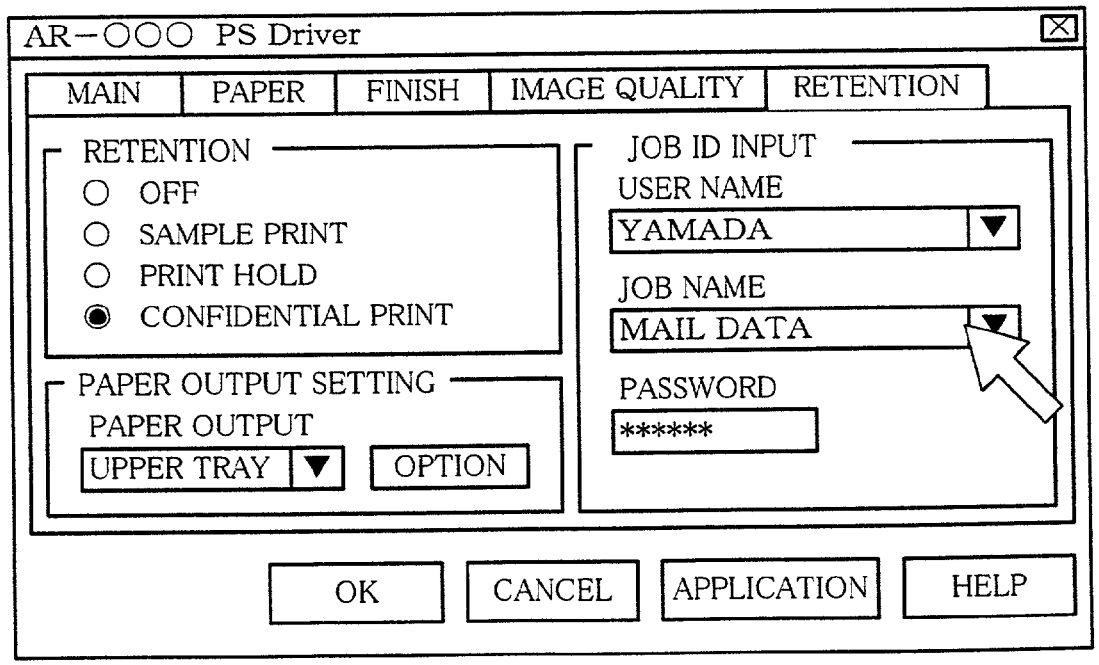

Then, the stored printing job information sending section 4h reads out the stored plural printing job names from the foregoing storage area, and the comparison result processing section 4d indicates a list of the printing job names on the display device 2g as shown in FIG. 12(a). The user selects the desired printing job name among the list. If "MAIL DATA" is selected as shown in the figure, the comparison result processing section 4d indicates "MAIL DATA" in the box for the printing job name as shown in the FIG. 12 (b), and converts the printing job name originally inputted manually or automatically to "MAIL DATA". Here, a pop-up display to make the user confirm whether the printing job name is finally set to "MAIL DATA" or not may be indicated.

Incidentally, since plural printing jobs with the same user name and the same printing job name might be set in such a conversion process, further conversion such as numbering each printing job information or the like may be provided after the selection from the list, in the same way as in the second embodiment, to make each display content distinguishable. Thus, even a few pieces of stored printing job information can handle multiple printing jobs. Furthermore, even if the stored printing job name is altered on the foregoing Property screen, the printing job name on the Property screen and the printing job name chosen on the printer driver setting screen always link, therefore the same printing job name is always used for storage or indication on the both screens.

As has been discussed, control software 4 described in the first through the third embodiments is made up of a program to make each above-mentioned process perform its function. This program is stored in a computer-readable recording medium. By such a recording medium, the printing output user interface control method of the embodiments is provided on the premise that it is used in a computer, featuring high versatility. Examples of this recording medium include the one being installed in the computer 2 and storing the program permanently, such as a hard disk or a semiconductor memory including a mask ROM, an EPROM, an EEPROM, and a flash ROM used as the ROM 2b and the non-volatile ROM 2d in FIG. 2. In addition, the examples may also include the one driven by the external medium drive device 2e and separatable from the device, including tapes such as a magnetic tape and a cassette tape, disks such as magnetic disks including a floppy disk, a removable hard disk and optical disks including a CD-ROM, a MO, a DVD, and cards such as an IC card (including a memory card) and an optical card.

In either case, the stored program may be programmed to be executed by the access of the CPU 2a, or may also be programmed in such a manner that the read-out program is downloaded to a program storage area such as the RAM 2b and executed. This program for downloading is supposed to be already stored in the main unit of the computer 2.

The above recording medium may be the one in which only the program to perform the foregoing printing output user interface control method is stored as control software 4, or the one in which the programs for the printer driver 4f and other tools are also included and stored together as control software 4. The former is effective in the case to apply the above printing output user interface control method to an existing printer 3. The latter case is applied when a newly configured printer 3 is supplied with its exclusive printer driver 4f, and the program of the above printing output user interface control method can be altered to suit the printer driver 4f. In this case, the supplied printer 3 is predicated on the use of the control software 4.

Besides, in the embodiments, since the computer 2 is equipped with the network I/O 2h and has a system configuration connectable to communication network including Internet, the recording medium may also be the one storing a program flexibly, like the one storing a program downloaded from communication network. Here, the program for downloading may be already stored in the main unit of the computer 2, or installed from another recording medium.

The contents stored in the recording medium is not limited to programs but may be data.

As has been discussed, a printing output user interface control method in accordance with the embodiments is a printing output user interface control method to control printing job information settings for a user interface which provides a printing-related information setting environment on a user interface display section provided in a printing data supply device, when printing data is supplied with the printing job information from the printing data supply device connected with a printing output device via network to the printing output device equipped with a printing job information display section displaying printing job information by each printing job, and the method includes the steps of:

a) receiving display capability information of the printing job information display section by the printing data supply device from the printing output device;

b) comparing printing job information manually or automatically inputted in the setting environment with the display capability information received by the printing data supply device in the step a); and c) providing a user with an indication to input the printing job information with characters suitable for the display capability of the printing job information display section when the printing job information is inputted with characters not suitable for the display capability of the printing job information display section.

Therefore, the display capability information of the printing job information display section of the printing output device is received in the printing data supply device beforehand, and compared with printing job information manually or automatically inputted. When characters used to input the printing job information are not suitable for the display capability of the printing job information display section, the user is prompted to input the information with characters suitable for the display capability, such as not Japanese but alphanumerics.

Thus, the user can set printing job information at the printing data supply device, using characters suitable for the display capability of the display device (printing job information display section) of the printing output device.

In addition, the printing output user interface control method in accordance with the embodiments is a printing output user interface control method to control printing job information settings for a user interface which provides a printing-related information setting environment on a user interface display section provided in a printing data supply device, when printing data is supplied with the printing job information from the printing data supply device connected with a printing output device via network to the printing output device equipped with a printing job information display section displaying printing job information by each printing job, and the method includes the steps of:

a) receiving display capability information of the printing job information display section by the printing data supply device from the printing output device;

b) storing printing job information on characters suitable for the display capability of the printing job information display section, in the printing data supply device, according to a user's operation;

c) comparing printing job information manually or automatically inputted in the setting environment with the display capability information received by the printing data supply device in the step a); and d) converting the inputted printing job information to the stored printing job information stored in the step b) when the printing job information is inputted with characters not suitable for the display capability of the printing job information display section.

Therefore, the display capability information of the printing job information display section of the printing output device is received in the printing data supply device, and printing job information on characters suitable for the display capability of the above printing job information display section is stored at the above printing data supply device, according to the user's operation, beforehand. Then, printing job information manually or automatically inputted in the setting environment is compared with the display capability information received beforehand, and if characters used to input the printing job information are not suitable for the display capability of the printing job information display section, the printing job information inputted in the setting environment is converted to the stored printing job information.

Thus, the user can set printing job information at the printing data supply device, using characters suitable for the display capability of the display device (printing job information display section) of the printing output device, without correcting unsuitable characters one by one.

Further, the printing output user interface control method in accordance with the embodiments can include the steps of:

storing a plurality of printing job information in the above step b); and displaying a list of a plurality of stored printing job information on said user interface display section, and converting printing job information inputted in the setting environment to the printing job information selected by the user from the list in the above step d).

Therefore, a plurality of printing job information is stored, and when characters used to input printing job information in the setting environment is not suitable for the display capability of the printing job information display section, a list of a plurality of stored printing job information is displayed on the user interface display section, and the inputted printing job information is converted to the one selected by the user from the list. Thus, since more types of printing job information are available for conversion, printing job information to be set can be converted according to the type of a printing job.

Furthermore, the printing output user interface control method in accordance with the embodiments can include the step of further converting display content when stored printing job information is selected and it could be used for a plurality of printing jobs, in order to make each printing job distinguishable.

Therefore, even if the same printing job information is selected for plural printing jobs, each printing job can be distinguished, thus even a few pieces of stored printing job information can handle multiple printing jobs.

Moreover, the printing output user interface control method in accordance with the embodiments can include the step of indicating the converted printing job information on said user interface display section, and prompting a user to confirm the conversion in the above conversion process.

Therefore, since the user can confirm the converted printing job information, the user can easily know the final indication of the printing job information on the printing job information display section of the printing output device.

In addition, a recording medium in accordance with the embodiments stores either embodiment of the printing output user interface control method of the foregoing invention, as a computer-readable program.

Therefore, since the printing output user interface control method of the foregoing invention is provided on the premise that it is used in a computer, the method features high versatility.

In addition, the printing data supply device in accordance with the embodiments is equipped with a computer to read the above program from the above recording medium and execute the program, including the case that the device has other functions as copying machine function.

Therefore, since the printing data supply device has a computer to conduct the printing output user interface control method of the foregoing invention, a user can easily set printing job information suitable for the display capability of the printing job information display section of the printing output device.

Furthermore, since the above printing data supply device and the above printing output device are connected via network in an information processing system in accordance with the embodiments, the printing job information display section of the printing output device in the information processing system always shows the indication suitable for the display capability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A printing output user interface control method for controlling printing job information settings for a user interface which provides a printing-related information setting environment on a user interface display section formed in a printing data supply device, when printing data is supplied with the printing job information from the printing data supply device connected with a printing output device via network to the printing output device equipped with a printing job information display section which indicates printing job information by each printing job, the method comprising:
   a) said printing data supply device receiving language display capability information of said printing job information display section from said printing output device, wherein the language display capability information indentifies one or more spoken languages that can be written and/or printed via characters and is stored in the printing data supply device;
   b) comparing printing job information manually or automatically inputted in the setting environment with the language display capability information received by said printing data supply device in said step a) that is stored in the printing data supply device; and
   c) providing a user with an indication to input the printing job information with language characters suitable for the language display capability of said printing job information display section when said comparing in step b) indicates that the printing job information is inputted with characters not suitable for the language display capability of said printing job information display section, and in response to said indication the user replacing said printing job information manually or automatically inputted in the setting environment with new printing job information having characters suitable for language display capability of said printing job information display section.

2. A printing output user interface control method for controlling printing job information settings for a user interface which provides a printing-related information setting environment on a user interface display section formed in a printing data supply device, when printing data is supplied with the printing job information from the printing data supply device connected with a printing output device via network to the printing output device equipped with a printing job information display section which indicates printing job information by each printing job, comprising:
   a) receiving language display capability information of said printing job information display section by said printing data supply device from said printing output device;
   b) storing printing job information on language characters suitable for the language display capability of said printing job information display section, in said printing data supply device, according to a user's operation;
   c) comparing printing job information manually or automatically inputted in the setting environment with the display capability information received by said printing data supply device in said step a); and
   d) converting the inputted printing job information to the stored printing job information stored in said step b) when the printing job information is inputted with characters not suitable for the display capability of said printing job information display section.

3. The printing output user interface control method of claim 2, further comprising:

storing a plurality of printing job information in said step b); and
displaying a list of a plurality of stored printing job information on said user interface display section, and converting printing job information inputted in the setting environment to printing job information selected by the user from the list in said step d).

4. The printing output user interface control method of claim 2, further comprising the step of further converting display content when stored printing job information is selected and it could be used for a plurality of printing jobs, in order to make each printing job distinguishable.

5. The printing output user interface control method of claim 2, further comprising the step of indicating the converted printing job information on said user interface display section, and prompting a user to confirm the conversion in the above conversion process.

6. A recording medium in which a printing output user interface control method is stored as a computer-readable program,
   the printing output user interface control method controlling printing job information settings for a user interface which provides a printing-related information setting environment on a user interface display section formed in a printing data supply device, when printing data is supplied with the printing job information from the printing data supply device connected with a printing output device via network to the printing output device equipped with a printing job information display section which indicates printing job information by each printing job,
   the printing output user interface control method comprising:
   a) receiving language display capability information of said printing job information display section from said printing output device, wherein the language display capability information identifies one or more spoken languages that can be written and/or printed via characters;
   b) comparing printing job information manually or automatically inputted in the setting environment with the language display capability information received by said printing data supply device in said step a); and
   c) providing a user with an indication to input the printing job information with language characters suitable for the language display capability of said printing job information display section when comparing in step b) indicates that the printing job information is inputted with characters not suitable for the language display capability of said printing job information display section, and in response to said indication the user replacing said printing job information manually or automatically inputted in the setting environment with new printing job information having characters suitable for language display capability of said printing job information display section.

7. A recording medium in which a printing output user interface control method is stored as a computer-readable program,
   the printing output user interface control method controlling printing job information settings for a user interface which provides a printing-related information setting environment on a user interface display section formed in a printing data supply device, when printing data is supplied with the printing job information from the printing data supply device connected with a printing output device via network to the printing output device equipped with a printing job information display section which indicates printing job information by each printing job, the printing output user interface control method comprising the steps of:
a) receiving language display capability information of said printing job information display section by said printing data supply device from said printing output device;
b) storing printing job information on language characters suitable for the language display capability of said printing job information display section, in said printing data supply device, according to a user's operation;
c) comparing printing job information manually or automatically inputted in the setting environment with the display capability information received by said printing data supply device in said step a); and
d) converting the inputted printing job information to the stored printing job information stored in said step b) when the printing job information is inputted with characters not suitable for the display capability of said printing job information display section.

8. A printing data supply device comprising a computer which reads said program from the recording medium of claim 6 and executes said program.

9. A printing data supply device comprising a computer which reads said program from the recording medium of claim 7 and executes said program.

10. An information processing system, wherein: the printing data supply device of claim 8 and said printing output device are connected via network.

11. An information processing system, wherein: the printing data supply device of claim 9 and said printing output device are connected via network.

12. The method of claim 1, further comprising storing a list of spoken languages and providing an indication to a user when the language of a print j oh does not match any of the languages on the list.

* * * * *